United States Patent [19]

Honma et al.

[11] Patent Number: 5,280,348
[45] Date of Patent: Jan. 18, 1994

[54] COLOR IMAGE PROCESSING APPARATUS WITH MEMORY INTERFACE SYNCHRONIZATION BETWEEN IMAGE SCANNER AND PRINTER OPERATIONS

[75] Inventors: Toshio Honma; Yoshinori Ikeda; Yasumichi Suzuki, all of Tokyo, Japan

[73] Assignee: Canon Kabushiki Kaisha, Tokyo, Japan

[21] Appl. No.: 369,699

[22] Filed: Jun. 21, 1989

Related U.S. Application Data

[62] Division of Ser. No. 932,030, Nov. 18, 1986.

[30] Foreign Application Priority Data

Nov. 18, 1985 [JP] Japan .................. 60-258102
Nov. 18, 1985 [JP] Japan .................. 60-258103
Nov. 18, 1985 [JP] Japan .................. 60-258104

[51] Int. Cl.$^5$ ............... H04N 1/21; H04N 1/23; H04N 1/32; H04N 1/393; H04N 1/46
[52] U.S. Cl. .................. 358/500; 358/401; 358/435; 358/444; 358/451
[58] Field of Search ............ 358/300, 296, 75, 77, 358/78, 448, 451, 474, 483, 444, 401, 409, 434, 435, 436, 438, 439, 442; 346/157; 365/154, 189.04

[56] References Cited

U.S. PATENT DOCUMENTS

| | | | |
|---|---|---|---|
| 3,675,218 | 7/1972 | Sechler | 365/154 |
| 4,040,094 | 8/1977 | Everett et al. | |
| 4,447,891 | 5/1984 | Kadota | 365/189.04 |
| 4,491,937 | 1/1985 | Chan | 365/154 |
| 4,504,969 | 3/1985 | Suzuki et al. | |
| 4,554,645 | 11/1985 | Furman | 365/189.04 |
| 4,564,864 | 1/1986 | Maeshima | 358/296 |
| 4,673,972 | 6/1987 | Yokomizo | 358/77 |
| 4,774,590 | 9/1988 | Haganuma | 358/401 |
| 4,851,927 | 7/1989 | Moriya | |

FOREIGN PATENT DOCUMENTS 0122430 10/1984 European Pat. Off.
2117208 10/1983 United Kingdom.

OTHER PUBLICATIONS

Wong, et al., "Adaptive Switching of Dispersed and Clustered Halftone Patterns for Bi-Level Image Rendition," *Society for Information Display, International Symposium of the SID*, 1977, Los Angeles, Calif., pp. 124-125.

*Primary Examiner*—Edward L. Coles, Sr.
*Assistant Examiner*—Scott A. Rogers
*Attorney, Agent, or Firm*—Fitzpatrick, Cella, Harper & Scinto

[57] ABSTRACT

A color image processing apparatus comprises a printer for printing an image corresponding to an original image scanned by an scanner. An image memory is provided into which signals from the color scanner respectively corresponding to plural colors are written and from which signals to be transmitted to the printer are read. The image memory is arranged such that a signal for a writing operation and a signal for a reading operation are substantially simultaneously input. A memory control unit addresses the image memory in either the writing operation or the reading operation. The memory control unit comprises a writing address counter, a reading address counter and a control means. The control means controls the writing address counter and the reading address counter such that image data is read from the image memory before the writing of the image data into the memory is completed.

21 Claims, 27 Drawing Sheets

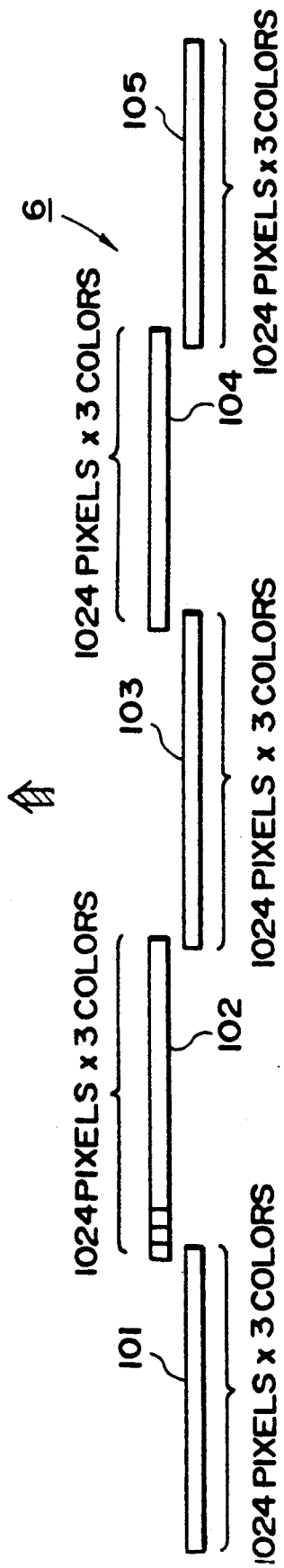
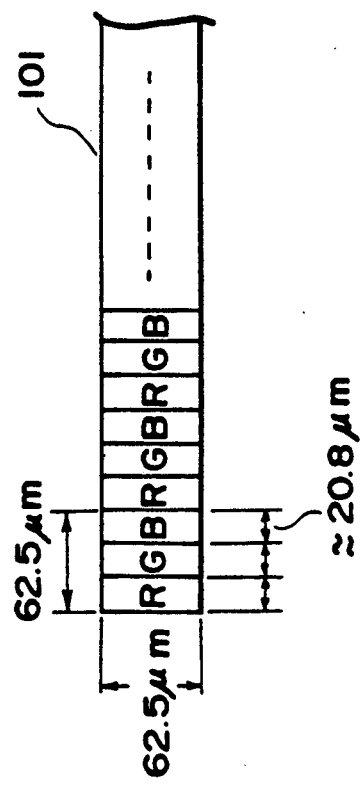
FIG. 3A
FIG. 3B a. B.D
b. R.V ENABLE
c. V. ENABLE
d. P.V ENABLE
e. LASER CONTROL SIGNAL
e'. LASER CONTROL SIGNAL

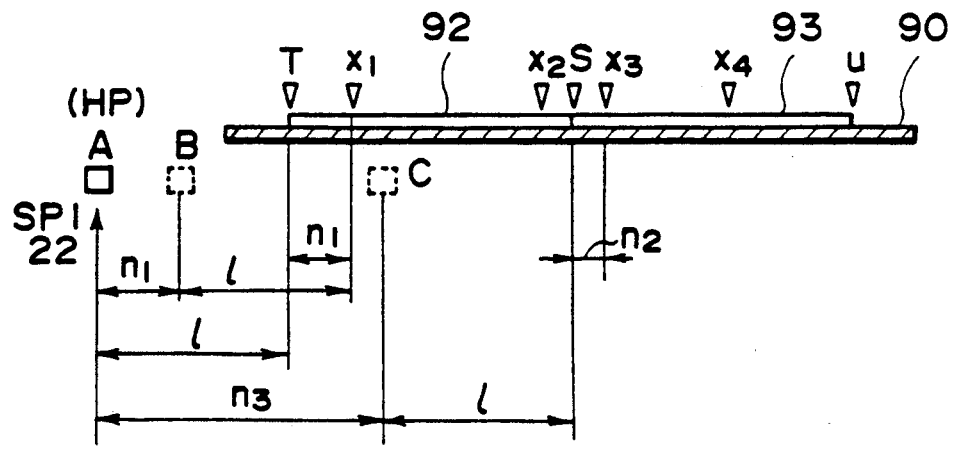
F I G. 8A
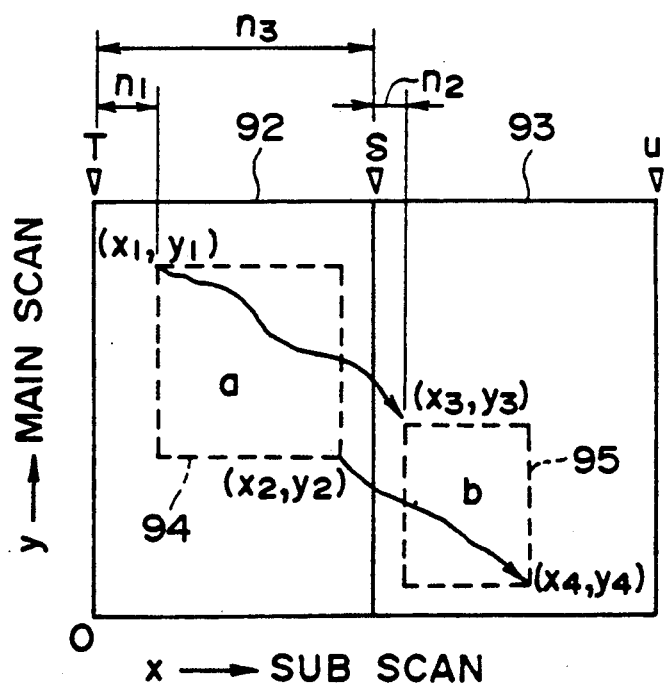
F I G. 8C

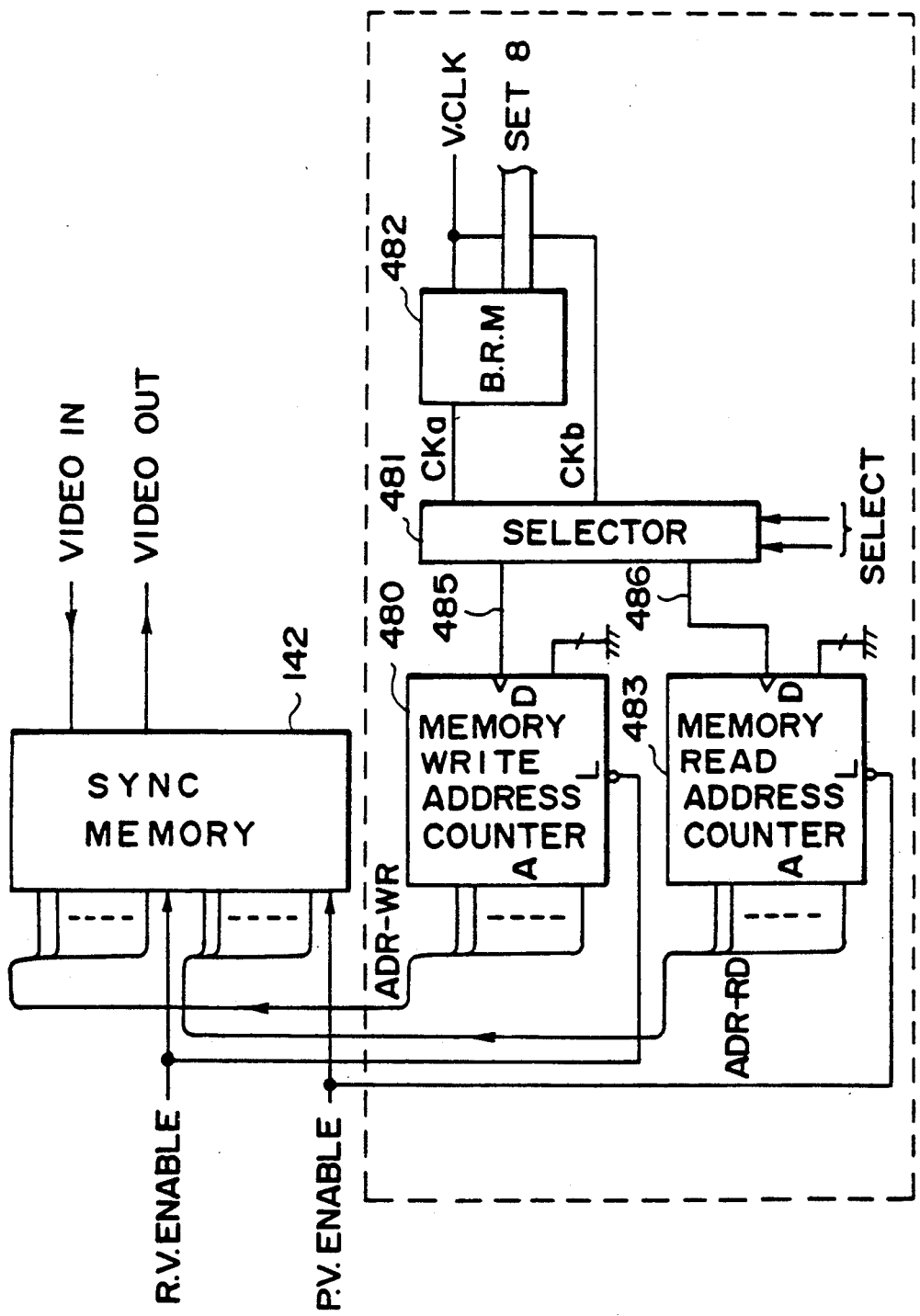
F I G. 13

COLOR IMAGE PROCESSING APPARATUS WITH MEMORY INTERFACE SYNCHRONIZATION BETWEEN IMAGE SCANNER AND PRINTER OPERATIONS

This application is a division of application Ser. No. 932,030 filed Nov. 18, 1986.

BACKGROUND OF THE INVENTION

1. Field of the Invention

The present invention relates to an image forming apparatus for reading and processing an image placed on an original document support and recording an image corresponding to such original image, and in particularly to such image forming apparatus capable of effecting plural different processing modes.

2. Related Background Art

In case of reproducing an original image on a sheet with different processings in different image areas, for example with different image magnifications in different area, such reproduction has been obtained by preparing two copies and obtaining a paste-up from these two copies. However such paste-up is not necessarily beautiful at the contour, and is cumbersome to make for the user.

Situation is also the same in case of taking a part of two original images and reproducing these on a same recording sheet with different processings. Though there have been developed complex color image editing apparatus in order to meet requirements such as inserting a color image into a black-and-white character original or moving a color image within a page, but such apparatus require an editing image memory, are expensive and complex in operation and are therefore unsuitable for the use in usual offices. Also in the usual color copying machines, even if image synthesis is achieved by making a paste-up as explained before, the obtained results are not satisfactory since the black characters may lose their image quality or the junctions of paste-up may become noticeable on the copy.

In the conventional color copying machines, a copy is obtained by separating the original image into three primary colors blue, green and red, and constructing a copy image with complementary color materials of yellow, magenta and cyan, which can be toners or inks employed for example in an electrophotographic process, a thermal transfer process or an ink jet process. However, in any process, since the color image has to be formed by superposing different coloring materials in succession, there inevitably results a color aberration, in the reproduction of fine lines, particularly of black characters, so that such black images appear as the mottles of different colors which are unpleasant for observation. Recently developed digital copying machines are trying to improve the image quality of black characters through new technologies such as black extraction, undercolor removal, edge enhancement etc., but these technologies are not yet complete and may at the same time deteriorate the image quality due to an edge enhancement noise in a halftone image if such halftone image area is included in the original image. In order to avoid such drawback there has been conceived to separate the image into a character image area and a halftone image area and to apply optimum processes respectively to edge area and halftone image area, but such method has never been conducted in complete manner.

SUMMARY OF THE INVENTION

In consideration of the foregoing, an object of the present invention is to provide an image forming apparatus capable of achieving plural copying modes without an editing image memory.

Another object of the present invention is to provide an image forming apparatus capable of applying different processes to respectively different areas of an original image placed on an original image support, then moving at least an image and synthesizing said images on a recording material.

Still another object of the present invention is to provide a color copying machine capable of image reproduction with tonal rendition in a multi-color copying mode and image reproduction with a high resolving power in case of reproducing black characters or the like in a monocolor copying mode, wherein the tonal rendition is improved in the multi-color copying mode than in the monocolor copying mode.

Still another object of the present invention is to provide a color image forming apparatus capable of an optimum reproduction of an original image in which color images and characters are mixed, by reproducing black characters or the like with a single color.

Still another object of the present invention is to provide a color image forming apparatus capable of varying the tonal correction characteristic according to the color to be formed.

The foregoing and still other objects of the present invention, and the advantages thereof, will become fully apparent from the following detailed description.

BRIEF DESCRIPTION OF THE DRAWINGS

FIG. 3A is a schematic view showing the arrangement of a color separating line sensor in an original scanning unit shown in FIG. 1;

FIG. 3B is a partial enlarged view thereof;

FIG. 7A-1, consisting of FIGS. 7A-1A and 7A-1B, is a flow chart of control sequence in case of reproducing a designated image area with a full-color image of high tonal rendition and other image areas with a single color image of a high resolving power;

FIG. 7A-2 is a schematic view showing the coordinates of the designated area in the mode shown in FIG. 7A-1;

FIG. 7A-3 is a timing chart showing image control signals in the mode shown in FIG. 7A-1;

FIGS. 7B-1 to 7B-3 are flow charts of control sequence of a mode of trimming and synthesizing two original images with the combination of single-color and full-color images;

FIG. 8A is a schematic view showing the scanning distances among an original support, a scanner home position and a scanner in a reader unit shown in FIG. 1;

FIGS. 8B-1, 8B-2 and 8B-3 are schematic views showing the relationship between a transfer drum in said printer unit and the position of the scanner shown in FIG. 1;

FIG. 8C is a schematic view showing the designated coordinates in the mode shown in FIG. 7B;

FIG. 13 is a block diagram of a magnification control circuit for the main scanning direction;

DETAILED DESCRIPTION OF THE PREFERRED EMBODIMENTS

Now the present invention will be clarified in detail by an embodiment thereof shown in the attached drawings.

System structure

Figure 1:
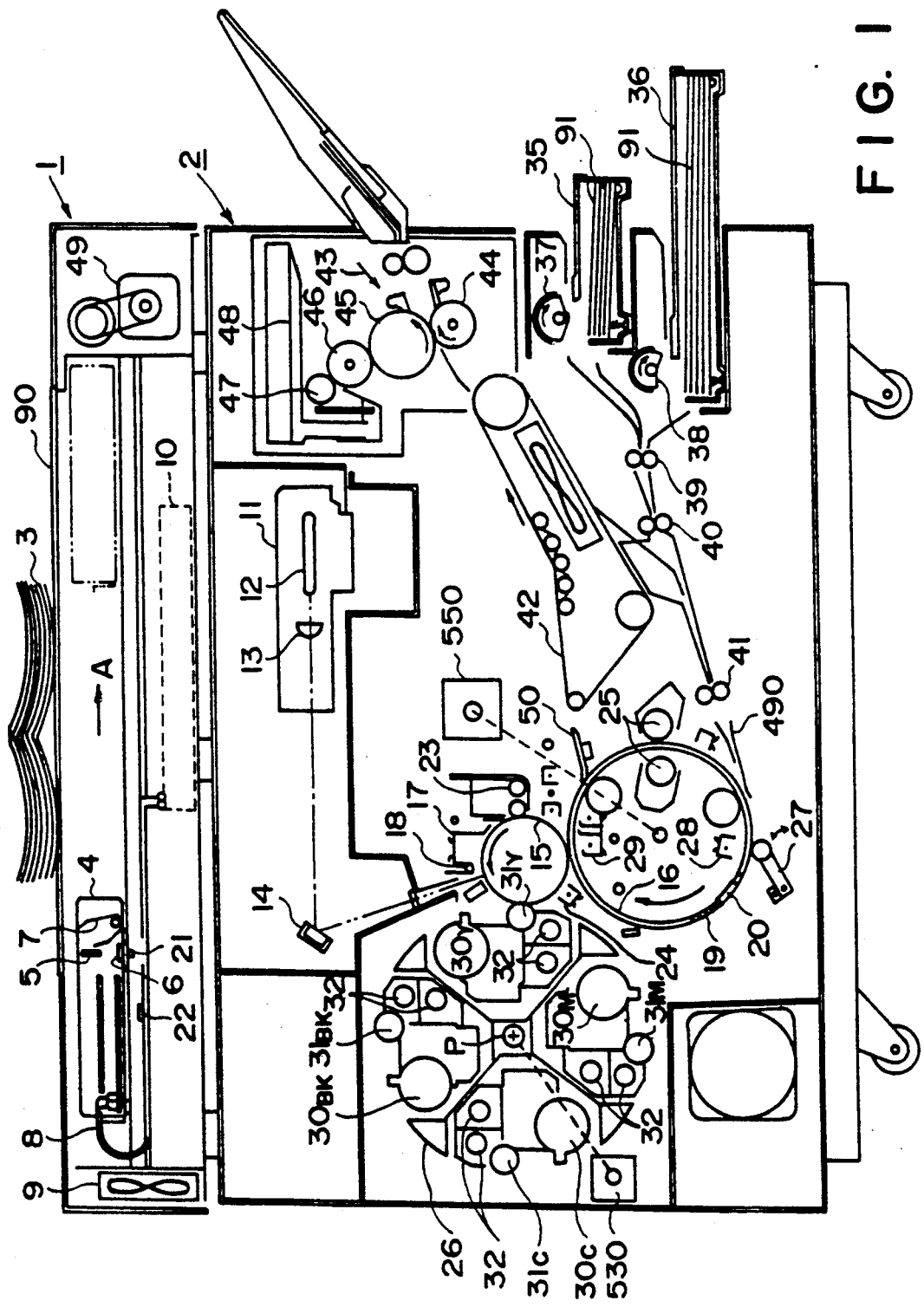
FIG. 1 is a cross-sectional view of a color digital copying apparatus embodying the present invention.

FIG. 1 schematically shows the internal structure of a color digital image processing apparatus embodying the present invention. The system is composed of a digital color image reading apparatus (color reader) 1 positioned in the upper part, and a digital color image printing apparatus (color printer) 2 positioned in the lower part. The color reader 1 reads the color image information of an original image in separated colors and converts said information into electrical digital image signals, by means color separating means to be explained later and a photoelectric converting element such as a CCD. The color printer 2 is composed of an electrophotographic laser beam color printer, capable of reproducing respective color images from said digital image signals and transferring said color images in digital dot forms onto a same recording sheet.

Reader

With respect to the color reader 1, there are shown an original document 3, and an original scanning unit 4, which is provided with a rod array lens 5; an equal-size color-separating line sensor (CCD) 6; an exposure lamp 7; a cable 8 for the original scanning unit 4; a cooling fan 9; and an image process unit 10 connected to said unit 4 through the cable 8.

When the original scanning unit 4 is moved in a direction A by a scanner driving motor 49 for reading the image of the original document 3 placed on an original support, the lamp 7 in said unit 4 is turned on simultaneously, and the light reflected from the original 3 is focused, by the rod array lens 5, onto the equal-size color-separating line sensor 6 for reading color image information.

Under the original scanning unit 4 there are provided an actuator 21 and a home position sensor 22, composed for example of a photointerruptor, for detecting the home position of the unit 4, in combination with the actuator 21.

Printer

In the color printer 2, a scanner 11 is provided with a laser unit (cf. FIG. 5) for converting the image signal from the reader 1 into an optical signal; a polygon mirror 12 (for example octagonal); a motor (not shown) for rotating said polygon mirror; and an f/θ imaging lens 13. The color printer is further provided with a mirror 14 for deflecting the laser beam, and a photosensitive drum 15. The laser beam from the laser unit is reflected by the polygon mirror 12, then guided by the lens 13 and the mirror 14 and performs a raster scanning on the photosensitive drum 15, thus forming a latent image thereon corresponding to the original image.

Around the photosensitive drum 15 there are provided a primary charger 17; a flush exposure lamp 18; a cleaner unit 23 for recovering untransferred toner; and a pre-transfer charger 24.

A developing unit 26 for developing the electrostatic latent images formed on the photosensitive drum 15 by the laser exposures is composed of developing sleeves 31Y, 31M, 31C, 31BK for effecting image development in contact with the photosensitive drum 15; toner hoppers 30Y, 30M, 30C, 30BK for holding reserve toners; and toner feeding screws 32; which are positioned about a rotary shaft P of the developing unit. For example, a yellow toner image can be formed by toner development at the illustrated position. For forming a magenta toner image, the developing unit 26 is rotated about the shaft P to bring the magenta developing sleeve 31M to a position contacting the photosensitive drum 15. Cyan or black toner development is conducted in a similar manner. The rotation of the developing unit is achieved by a motor 530.

There is also provided a transfer drum 16, for transferring the toner images formed on the photosensitive drum 15 onto a recording sheet. Around said transfer drum 16 there are provided an actuator plate 19 for detecting the position of the transfer drum 16, a home position sensor 20 detecting a home position of said drum 16 when said actuator 19 approaches; a transfer drum cleaner 25; a sheet holding roller 27; a charge eliminator 28; and a transfer charger 29.

There are further provided sheet cassettes 35, 36 housing recording sheets; feed rollers 37, 38 for feeding recording sheets from said cassettes 35, 36; and timing rollers 39, 40, 41. A sheet fed by these components is guided by guide members 490, then wound on the transfer drum 16 while the front end is held by a gripper to be explained later (51 in FIG. 6) and enters an image forming process.

There are further shown a drum motor 550 for rotating the photosensitive drum 15 and the transfer drum 16 in synchronization; a peeling finger 50 for peeling the sheet from the transfer drum 16 after the image formation; a conveyor belt 42 for transporting thus peeled sheet; and an image fixing unit 43 provided with heat-pressure rollers 44, 45 for fixing the image on the sheet transported by the conveyor belt 42.

Control circuit

Figures 2, 2A:
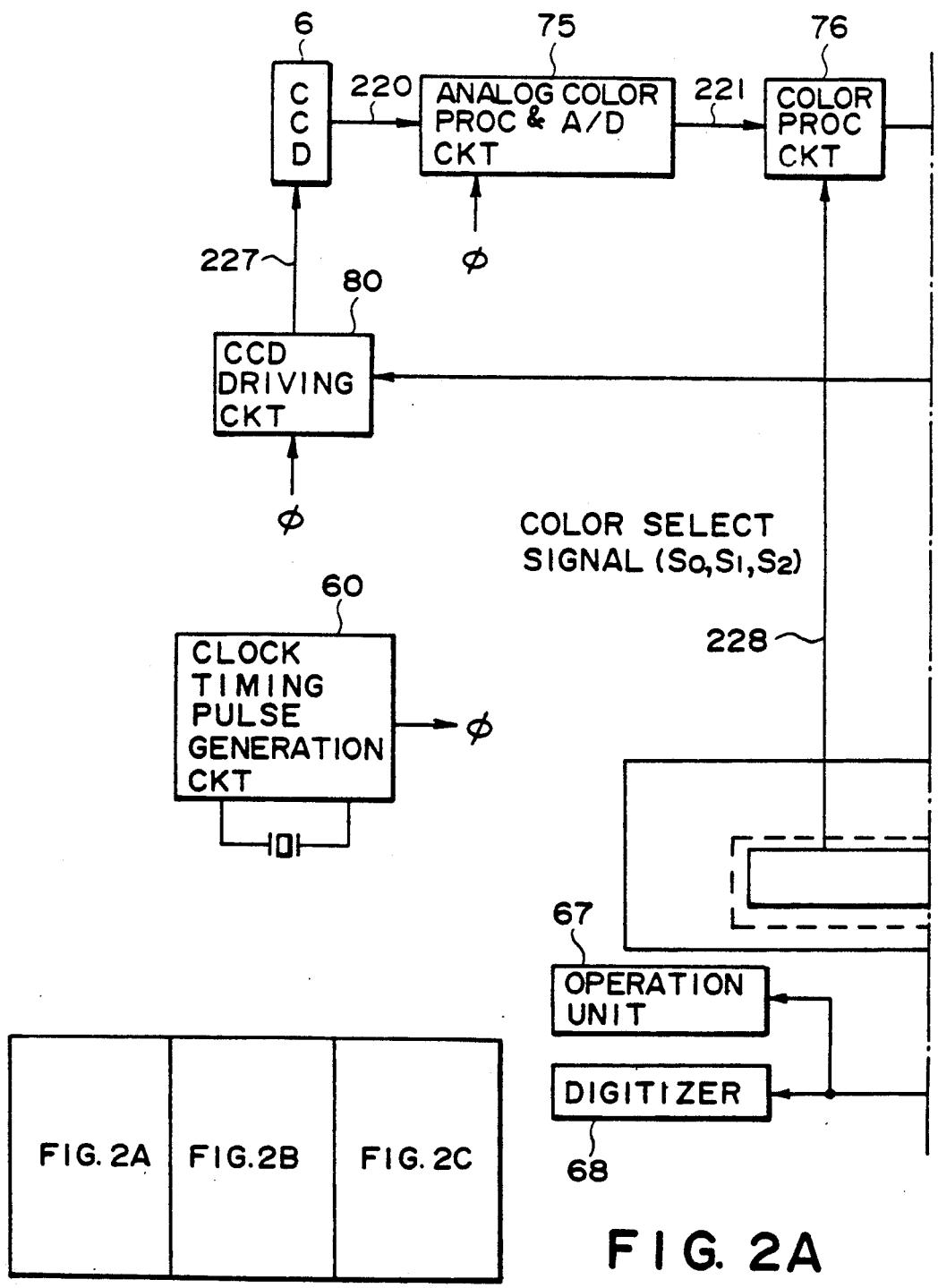
FIG. 2, consisting of FIGS. 2A to 2C, is a block diagram of an electronic circuit of the color digital copying apparatus shown in FIG. 1.
Figure 2B:
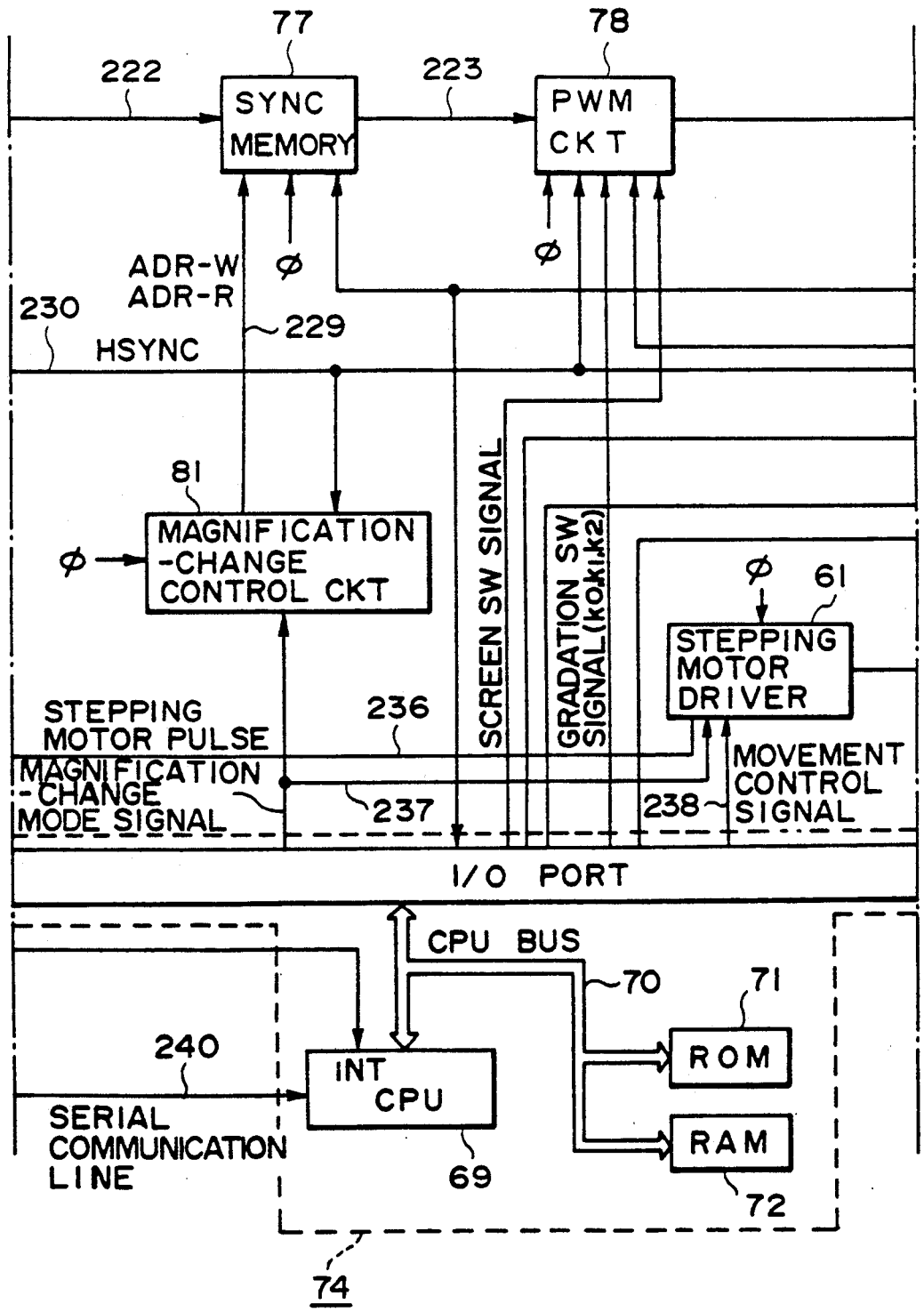
Figure 2C:
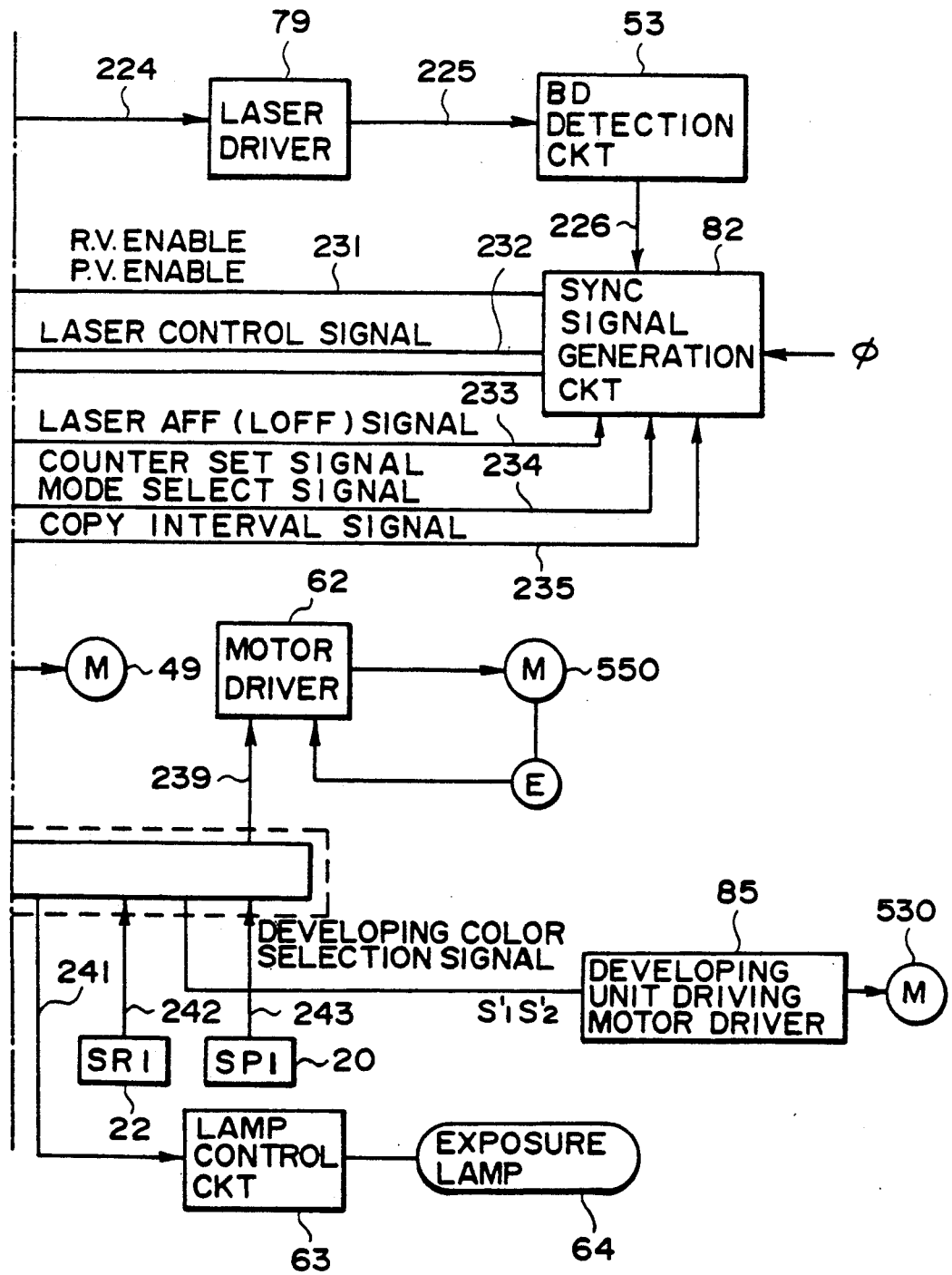

Now reference is made to a block diagram shown in FIG. 2, for explaining the portion related to the present invention, among the entire electric circuit of the present embodiment.

The reader 1 and the printer 2 are controlled by a controller 74, composed of a CPU 69, a ROM 71, a RAM 72, an I/O port 73 and a CPU bus 70 connecting these components. The controller 74 receives from the scanner unit home position sensor 22, signal SR1 corresponding to a scanning top signal, and from the printer drum home position sensor 20, signal SP1 corresponding to a printing top signal or sheet front end signal or image front end signal. The CPU 69 communicates with an operation unit 67 and a digitizer 68 through a serial communication line 240, thus receiving commands from the operator. The digitizer 68 enters coordinate information relating to the editing of the original image to be copied, for example area disignation and area moving. The operation unit 67 enters not only copy number and copy magnification but also copy mode information in and outside the designated image area, such as multicolor, mono-color, tonal conversion characteristic, resolving power, color conversion mode etc. The controller 74 also controls the moving direction, speed and position of the original scanning unit 4, by supplying a driver 61 for a scanner driving stepping motor 49 of said unit 4 with a magnification-change mode signal and a movement control signal respectively through lines 237, 238. The stepping motor driver 61 supplies stepping motor pulses, through a line 236, to an interruption port INT of the CPU 69, as the position information of the unit 4. Also, when the original scanning unit 4 is not in the copying operation, a detecting signal from the home position sensor (SR1) 22 is entered through a line 242. Also the controller 74 supplies an ON/OFF command, through a line 239, to a motor drive 62 for the drum motor 550 of the printer 2.

The drum motor 550 is composed of a DC motor and a rotary encoder (E), and is speed controlled by a PLL control circuit in the motor driver 62. The controller 74 also receives a detection signal, through a line 243, from the home position sensor (SD1) 20 of the transfer drum 16. The controller 74 also supplies, through a line 241, an ON/OFF command to a control circuit 63 for the exposure lamp 7. Said control circuit 63 also performs a constant voltage control for the lamp 7.

The laser beam emitted from the laser scanner 11 is detected by a beam detection circuit 53 at each scanning on the photosensitive drum 15 to generate a beam detection signal BD, which is supplied, through a line 226, to a synchronization signal generating circuit 82. Said circuit 82 also receives a copy interval signal received from the controller 74 through a line 235, a counter set signal and a mode select signal through a line 234 and a video clock signal VCLK, and generates video synchronization signals HSYNC, V.ENABLE, R.V.ENABLE, and P.V.ENABLE. Also said circuit 82 releases a laser control signal through a line 232, in response to a laser off (LOFF) signal supplied from the controller 74 through a line 233. [Synchronization signal generating circuit]

Figure 10A:
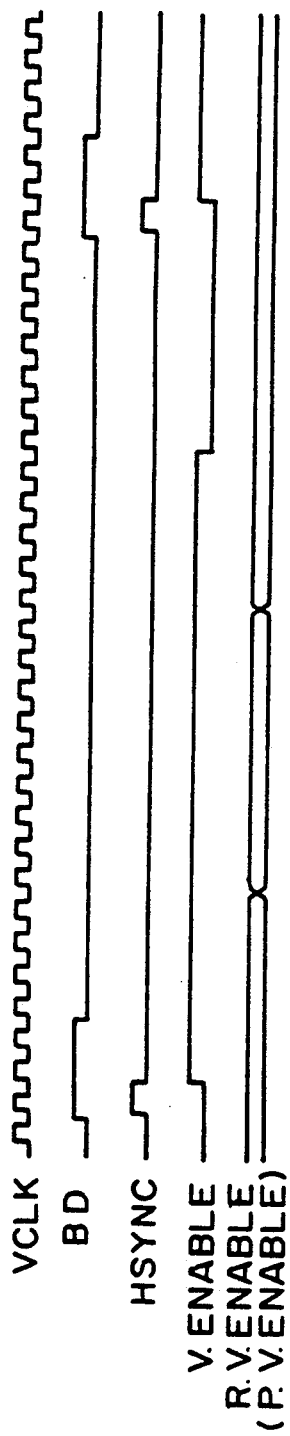
FIG. 10A is a timing chart showing the generation of an image synchronization signal from a beam detection signal.
Figure 11:
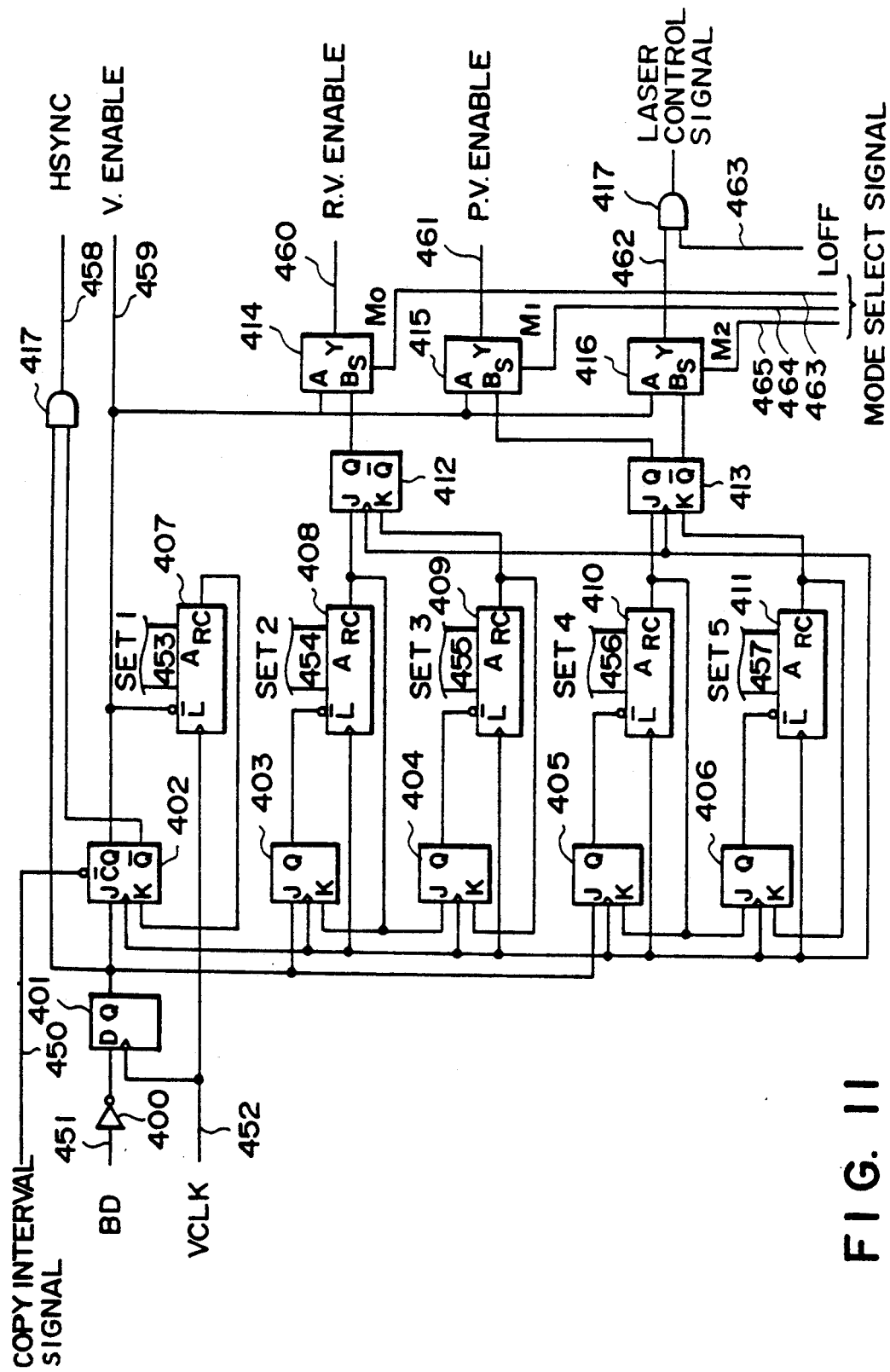
FIG. 11 is a circuit diagram of a synchronization signal generating circuit for generating an effective interval signal and a laser control signal in the main scanning direction of a reader and a printer.

Now reference is made to FIGS. 10A and 11 for explaining the function of the synchronization signal generating circuit 82. The copy interval signal 450, assuming H-level during a copying operation, is utilized for generating synchronization signals and controlling the entire circuit by enabling the laser unit. When said copy interval signal 450 is shifted to the H-level, a J/K-flip-flop 402 is activated, and the start of the BD signal, synchronized with a clock pulse VCLK in a D-flip-flop 401, is supplied to J/K-flip-flops 402, 403, 405. The J/K-flip-flop 402 and an AND gate 417 generates the HSYNC signal for a cycle of clock pulse VCLK immediately after the start of the BD signal, and generating the V.ENABLE signal in synchronization with the end of the HSYNC signal, by shifting the output Q of the J/K-flip-flop 402 to the H-level, whereby a counter 407 is released from loading ($\overline{L}$). The controller 74 supplies counter set signals SET1-5 respectively to counters 407-411. Thus the counter 407 counts the counter set signal SET1, and, upon counting up, releasing a signal RC to reset the J/K-FF 402, thus terminating the V.ENABLE signal.

Similarly the J/K-FF 403 activates, simultaneously with the start of the V.ENABLE signal, the counter 408 which thus counts the set signal SET2 and, upon counting up, releases a signal RC to reset the J/K-flip-flop 403 and simultaneously set a J/K-flip-flop 412. Also simultaneously the J/K-flip-flop 404 is set to activate the counter 409, which thus counts the set signal SET3, and, upon counting up, releases a signal RC to reset the J/K-FF 404, 412. In this manner the flip-flop 412 is set, after a left margin corresponding to the set signal SET2, from the start of the V.ENABLE signal, and is reset after an effective interval corresponding to the set signal SET3. The Q output of the flip-flop 412 is supplied, together with the V.ENABLE signal, to a selector 414 to generate a reader-video enable signal R.V.ENABLE according to the selection by a mode select signal 463. Similarly a J/K-FF 413 is set, after a left margin corresponding to the set signal SET4, from the start of the V.ENABLE signal, and is reset after an effective interval corresponding to the set signal SET5. The Q output of said flip-flop 413 is supplied, together with the V.ENABLE signal, to a selector 415 to generate a printer-video enable signal P.V.ENABLE according to the selection by the mode select signal 464. Also the $\overline{Q}$ output of said flip-flop 413 is supplied, together with the V.ENABLE signal, to a selector 416, to generate a laser control signal according to the selection by the mode select signal 465. Said laser control signal is supplied to an AND gate 417 and is subjected to the on-off control by the signal LOFF of the controller 74.

Again referring to FIG. 2, the R.V.ENABLE and P.V.ENABLE signals are supplied through a line 231 to a synchronization memory circuit 77 to respectively determine the video effective intervals in the main scanning direction of the reader and printer. Also the laser control signal is supplied, through a line 232, to a pulse width modulation (PWM) circuit 78 to determine a masking area, in the main and sub scanning directions, of the printer.

A clock timing pulse generating circuit 60 generates various timing pulses and clock signals $\phi$, synchronized with a crystal vibrator 64, including a video clock signal VCLK and a clock signal 2VCLK of a doubled frequency.

Reading circuit

Now reference is made to FIGS. 3A, 3B, 4A and 4B for explaining the CCD 6 and an analog color process and A/D coversion circuit 75.

As shown in FIG. 3A, the equal-size color-separating line sensor 6 is composed of a staggered arrangement of 5 chipes each containing 1024 pixels, each of which has a dimension of 62.5 μm square (1/16 mm). Each pixel is divided, as shown in FIG. 3B, into three areas of a size of 20.8 × 62.5 μm each, provided respectively with blue, green and red filters. At image reading the scanning is conducted as indicated by an arrow in FIG. 3A to read color-separated images of the original 3 shown in FIG. 1.

Figure 4A:
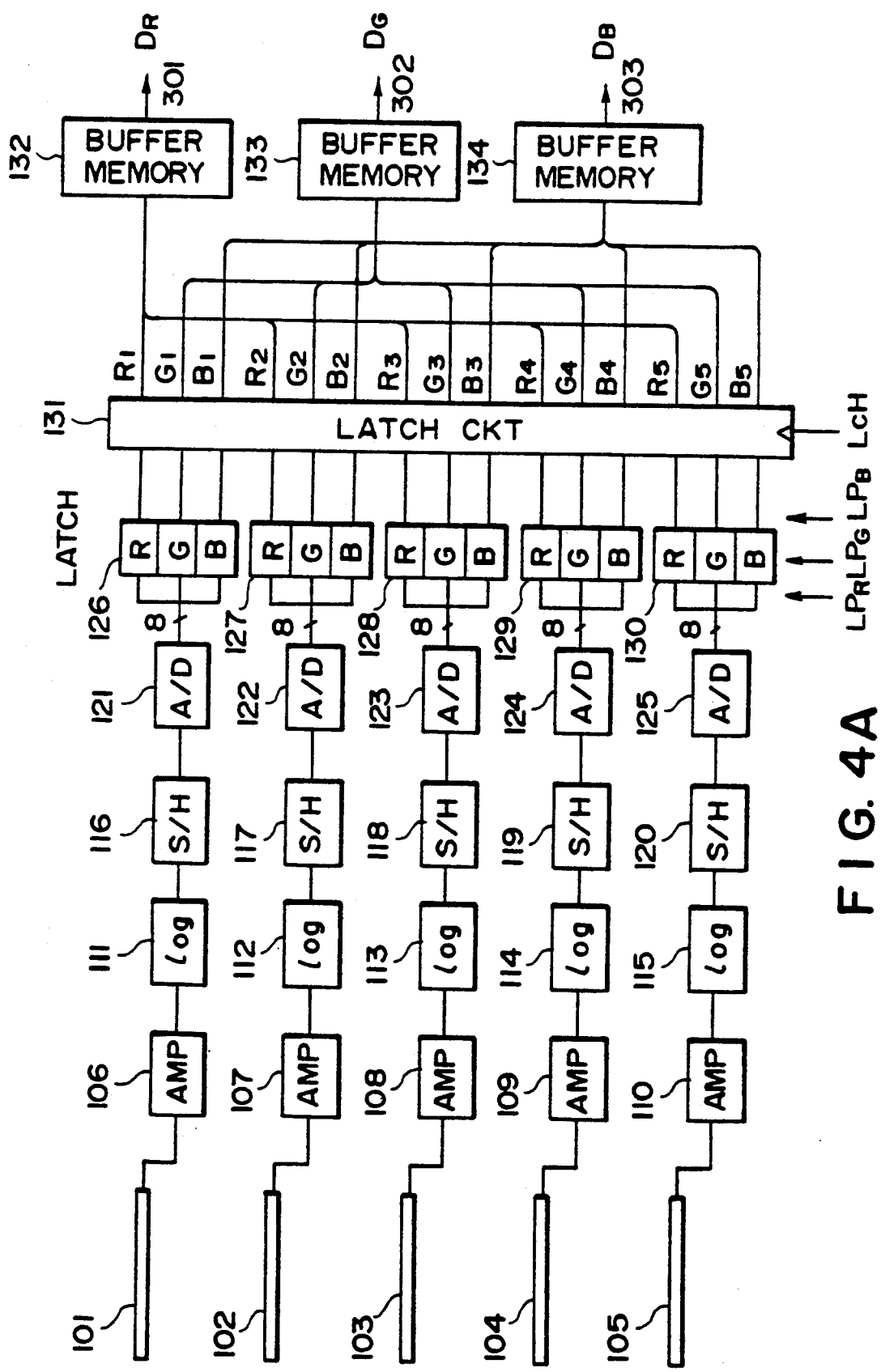
FIG. 4A is a block diagram of a color reading circuit.

FIG. 4A shows an analog color process and A/D conversion circuit 75 for digitizing the color-separated image signals, obtained from the above-explained color reading sensor composed of 5 chips in staggered arrangement 101-105, into digital data of 8 bits and supplying the same to a color process circuit (FIG. 5) to be explained later.

In the following explanation reference is also made to FIG. 4B in connection with FIG. 4A.

Analog pixel signals separated into color components R, G, B of the original 3 by the color reading sensors 101-105 are amplified by amplifiers 106-110 and converted into density values by logarithmic conversion circuits 111-115. Each pixel signal is serially released in the order of R1, G1 and B1, in synchronization with a pixel signal transfer clock signal 201, as shown by As in FIG. 4B.

Figure 4B:
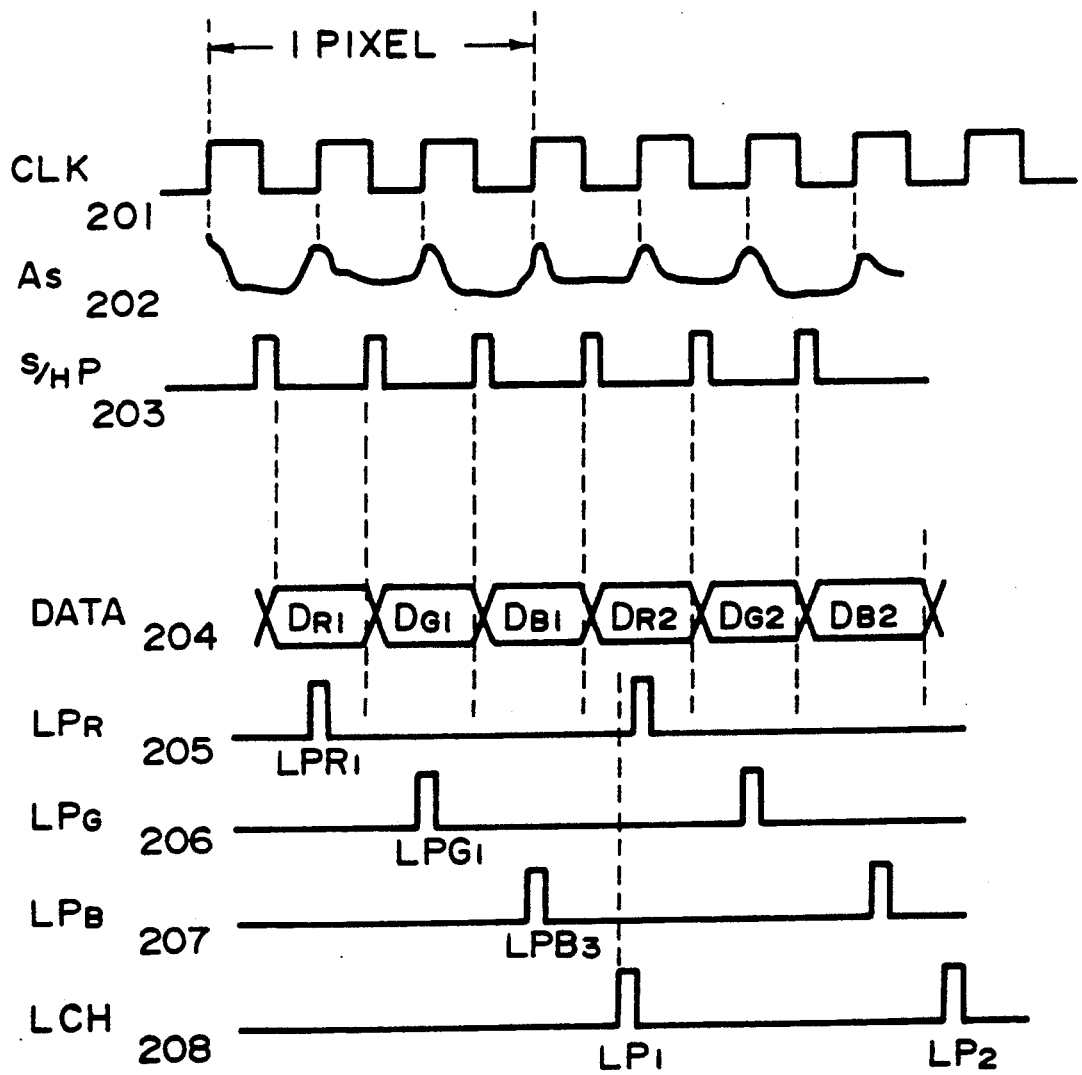
FIG. 4B is a timing chart showing signals thereof.

The sample hold circuits (S/H) 116-120 effect the sample holding of the input image signals at the timing of a sampling signal S/HP 203 shown in FIG. 4B, and A/D converters 121-125 effect A/D conversion to obtain image signals of 256 levels or 8 bits.

In each pixel of thus color-separated and digitized image signal, the color-separated data are transferred time-sequentially and serially, as represented by DATA 204 in FIG. 4B. Thus, in order to effect color processing in the color process circuit (FIG. 5), the data DR1, DG1, DB1, respectively corresponding to red, green and blue, have to be synchronized to a same phase in advance.

Thus the data DR1, DG1, DB1, ... of the DATA 204 are latched in succession in latch circuits 126-130 by latch pulses $LPR_1$ 205, $LPG_1$ 206, $LPB_1$ 207 having delays in time, and the outputs LPR, LPG, LPB of said latch circuits 126-130 are latched in a succeeding latch circuit 131 by a latch pulse LCH 208. In this manner the latch circuit 131 finally latches the color-separated data of a same pixel at a same time phase.

Since the color reading sensors 101-105 are arranged in staggered manner as shown in FIG. 3A, there are provided buffer memories 132-134 for storing data of plural lines in order to obtain continuous image data DR, DG, DB of red, green and blue.

Color process circuit

Figure 5:
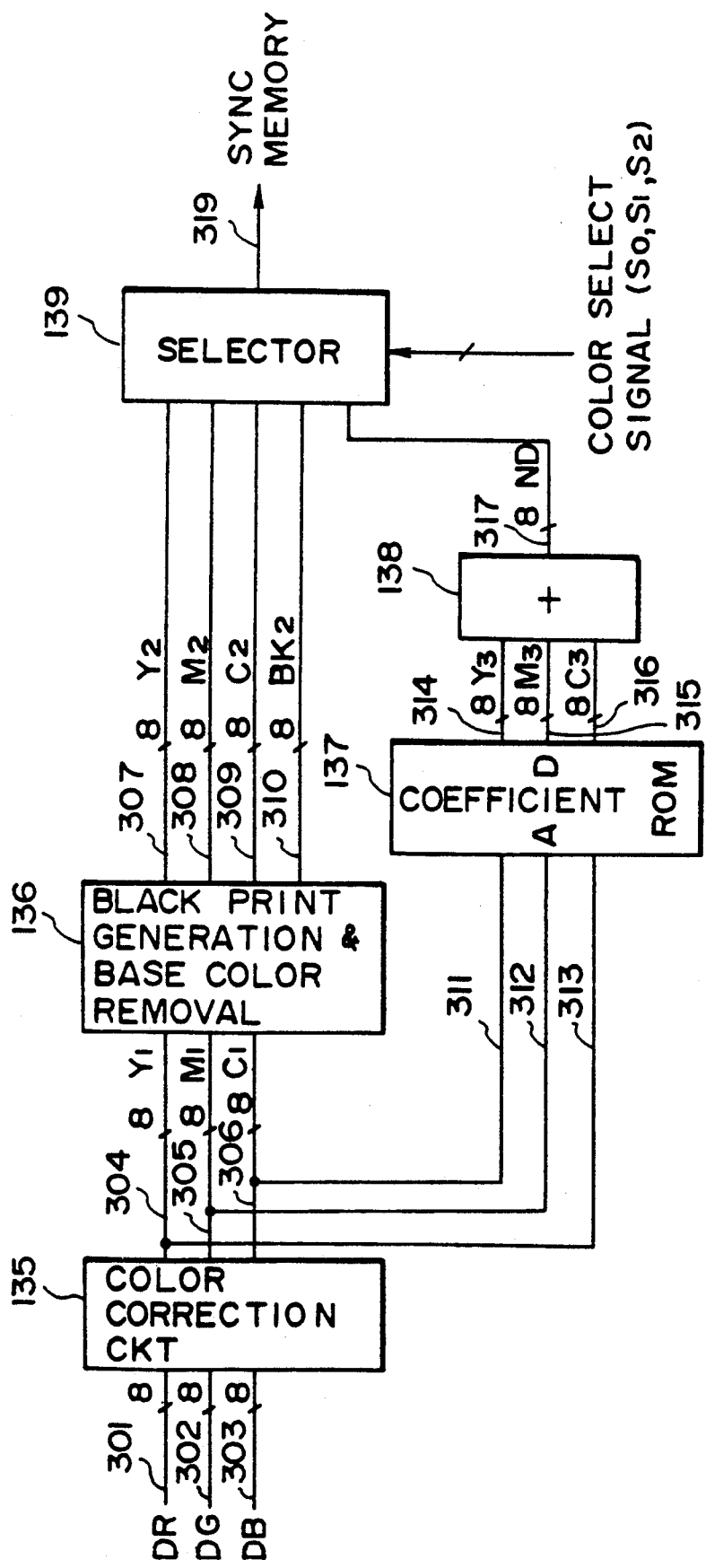
FIG. 5 is a block diagram of a circuit for color image signal processing, neutral density signal generation and color image signal selection.

The color-separated image signals DR, DG, DB of 8 bits and of a same phase for each pixel obtained in the above-explained manner are subjected to a predetermined processing in a color process circuit 76 shown in FIG. 5. A color correction circuit 135 effects a masking process (1) explained in the following, and a black generation and undercolor removal circuit 136 effects a process (2) also explained in the following.

(1) Masking process: The color correction circuit 135 applies a following matrix calculation (1) to the input pixel data DR, DG, DB 301-303 for compensation for the unnecessary color components of the toners:

$$\begin{bmatrix} Y1 \\ M1 \\ C1 \end{bmatrix} = \begin{bmatrix} a1, a2, a3 \\ b1, b2, b3 \\ c1, c2, c3 \end{bmatrix} \begin{bmatrix} DR \\ DG \\ DB \end{bmatrix} \quad (1)$$

wherein ai, bi and ci (i=1-3) are appropriately determined masking coefficients, and Y1, M1 and C1 are output signals 304-306 of yellow, magenta and cyan.

(2) Black color generation and undercolor removal: The circuit 136 determined the amounts of toners Y2, M2, C2 (307-309) through calculations $Y2 = Y1 - \alpha k$, $M2 = M1 - \beta k$ and $C2 = C1 - \gamma k$, wherein k is the minimum value of the signals Y, M and C and determines the black signal BK by $BK = \delta k$ (310) wherein the coefficients $\alpha, \beta, \gamma$ and $\delta$ are to be determined appropriately.

Simultaneously the signals Y1, M1, C1 are supplied, through lines 311, 312, 313, to coefficient ROM's for a table conversion by multiplying coefficients a4, b4 and c4 respectively, thus obtaining signals Y3, M3 and C3 through lines 314, 315 and 316. Said signals are added in an adder 138 to obtain a neutral density (monochromic) signal ND in a line 317, wherein:

$$Y3 = a4 \cdot Y1$$

$$M3 = b4 \cdot M1$$

$$C3 = c4 \cdot C1$$

$$a4 + b4 + c4 \approx 1$$

Consequently the neutral density signal ND is the average of the image signals separated by the red, green and blue filters, and is close to the density of image signal over the entire visible range.

The image signals Y2, M2, C2 and BK 307-310, obtained in the above-explainec circuit 136, are utilized as basic data for the toner images to be formed finally on the printer 2. However, as will be explained later, the color printer employed in the present embodiment is unable to simultaneously print the toner images of yellow, magenta, cyan and black on a recording sheet but has to superpose these images in succession in order to obtain a final color image. For this reason the color signals Y2, M2, C2, BK and ND obtained in said circuit 136 have to be suitably selected corresponding to the function of the color printer 2.

This selection is made to a succeeding selector 139, which selects, in response to the combination of color select signals S0, S1, and S2 from the controller 74, one of five image signals Y2, M2, C2, BK and ND and supplies the same to the printer. In the present system, therefore, there are required toner image forming processes corresponding to the number of colors of toners in order to read and reproduce a color original image.

The present system is capable of color conversion, i.e. reproducing a selected color signal Y, M, C, BK or ND with an arbitrary color, by selecting different developed color select signals S'1, S'2 for the color select signals S1, S2. Said signals S'1, S'2 so activate the motor driver 85, shown in FIG. 2, as to select a yellow development in (0, 0), a magenta development in (0, 1), a cyan development in (1, 0) or a black development in (1, 1). Also the ND signal may be represented not only in black but also in cyan, magenta or yellow.

The image signal selected in the above-explained manner is supplied, through a line 319, to the synchronization memory circuit 77.

Magnification-change/movement control circuit

Figure 12:
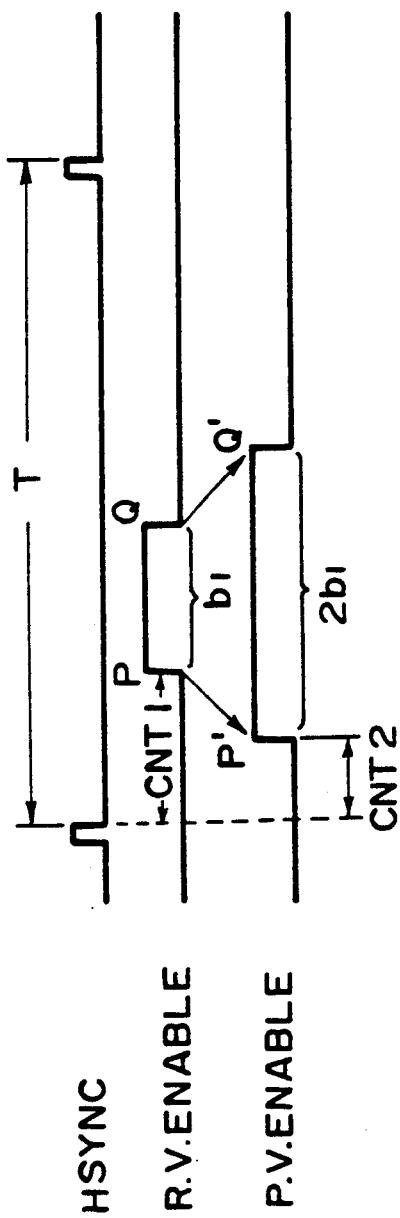
FIG. 12 is a timing chart showing signals for position change and magnification change in the main scanning direction.

The sync. memory 77, which is a buffer memory for magnification change and position movement of the video signal in the main scanning direction, is controlled by a memory write address signal ADR-W, a memory read address signal ADR-R, and signals R.V. ENABLE and P.V.ENABLE supplied from a magnification-change control circuit 81. Reference is now made to FIGS. 12 and 13. In case of moving an image of the effective period of the R.V.ENABLE signal shown in FIG. 12, starting at P (CNT1) from the start of the main scanning of the reader and ending at Q after b1, with a magnification change to a position starting at P' (CNT2) from the start of the main scanning of the printer and ending at Q' after 2b1, wherein CNT1, CNT2, b1 and 2b1 represent the counts of the clock pulses VCLK, the copy interval signal of the synchronization signal generating circuit 82 is set in the following manner: SET2=CNT1; SET3=b1; SET4=CNT2; and SET5=2b1.

In this manner the left margin counters 454, 456 and the effective interval counters 455, 457 of the reader and the printers are appropriately set to effect counting after the HSYNC signal and to generate the R.V.ENABLE and P.V.ENABLE signals shown in FIG. 12.

The above-mentioned position change in the main scanning direction is achieved by effecting the writing and reading operation of the synchronization memory circuit 77 with the effective image reading interval signal R.V.ENABLE and the effective printing interval signal P.V.ENABLE. More specifically, the image data of a line stored in the memory 77 from P to Q of said effective interval signal R.V.ENABLE shown in FIG. 12 are read in an interval from P' to Q' of the effective interval signal P.V.ENABLE, thus achieving position change from P to P' and Q to Q' in the main scanning direction.

Figures 14A, 14B:
FIG. 14A is a wave form chart showing an example of the signals in the circuit shown in FIG. 13.
FIG. 14B is a chart explaining a selector signal shown in FIG. 13.

FIG. 13 shows an example of a magnification-change control circuit for a magnification change in the main scanning direction, provided with address counters 480, 483 for supplying the memory 77 respectively with a write address and a read address, by counting the pixel transfer clock signal VCLK or a reduced-rate clock signal CKa. A binary rate multiplier 482 generates said reduced-rate clock signal CKa by eliminating a part of the clock signal VCLK at a rate determined by a set signal SET8 as shown in FIG. 14A. As an example, for a set signal SET8 of 8 bits ($2^8=256$), an output frequency $f_{out}$ is given by a following equation, as a function of the input frequency $f_{in}$:

$$f_{out}=M/256 \cdot f_{in}$$

wherein M is a value set by the signal SET8.

In the example shown in FIG. 14A, M is set as 192, so that the output frequency $f_{out}$ is reduced to ¾ of the input frequency $f_{in}$.

The magnification change is achieved by supplying said reduced clock signal CKa and the input clock signal VLCK (CKb) to a clock generating selector 407 of the address counters 405, 406. A desired magnification change can be achieved by selecting the clock signals CKa, CKb in combinations shown in FIG. 14B. Also a continuous magnification change is rendered possible by continuously varying the value M of the set signal SET8.

Pulse width modulating circuit

The video signal, subjected to magnification change and position movement in the synchronization memory circuit, is supplied, through a line 223 shown in FIG. 2, to the pulse width modulating (PWM) circuit 78 also shown in FIG. 2, which effects D/A conversion of the digital video signal and performs a pulse width modulation through comparison with a triangular wave of predetermined frequency and phase. It also switches the screen line according to the image signal, in response to a screen line selection signal SCRSEL supplied from the controller 74, and switches the tone of the image signal in response to tone select signals K0, K1, K2.

Figure 15A:
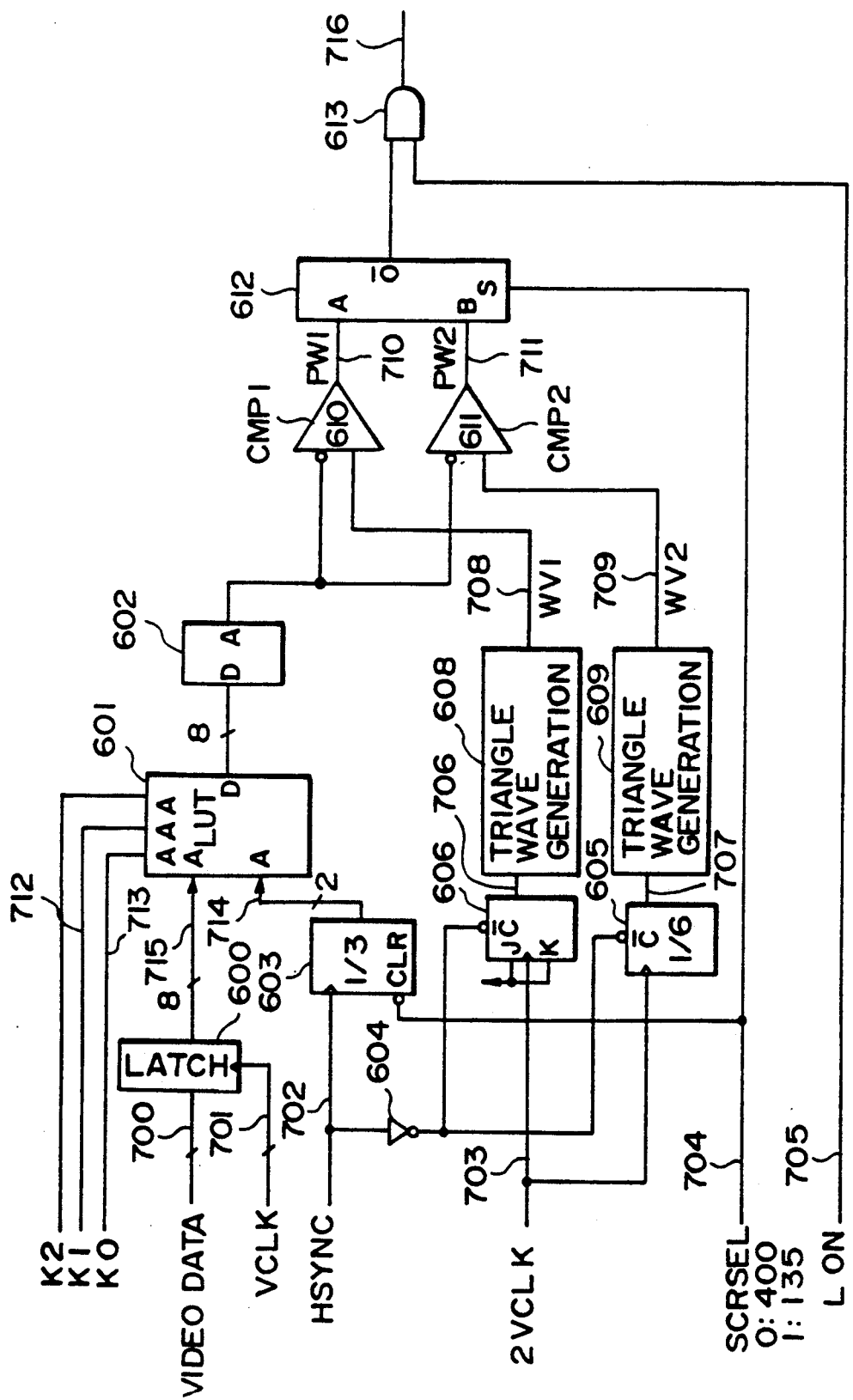
FIG. 15A is a circuit diagram for pulse width modulation of image signal.
Figure 15B:
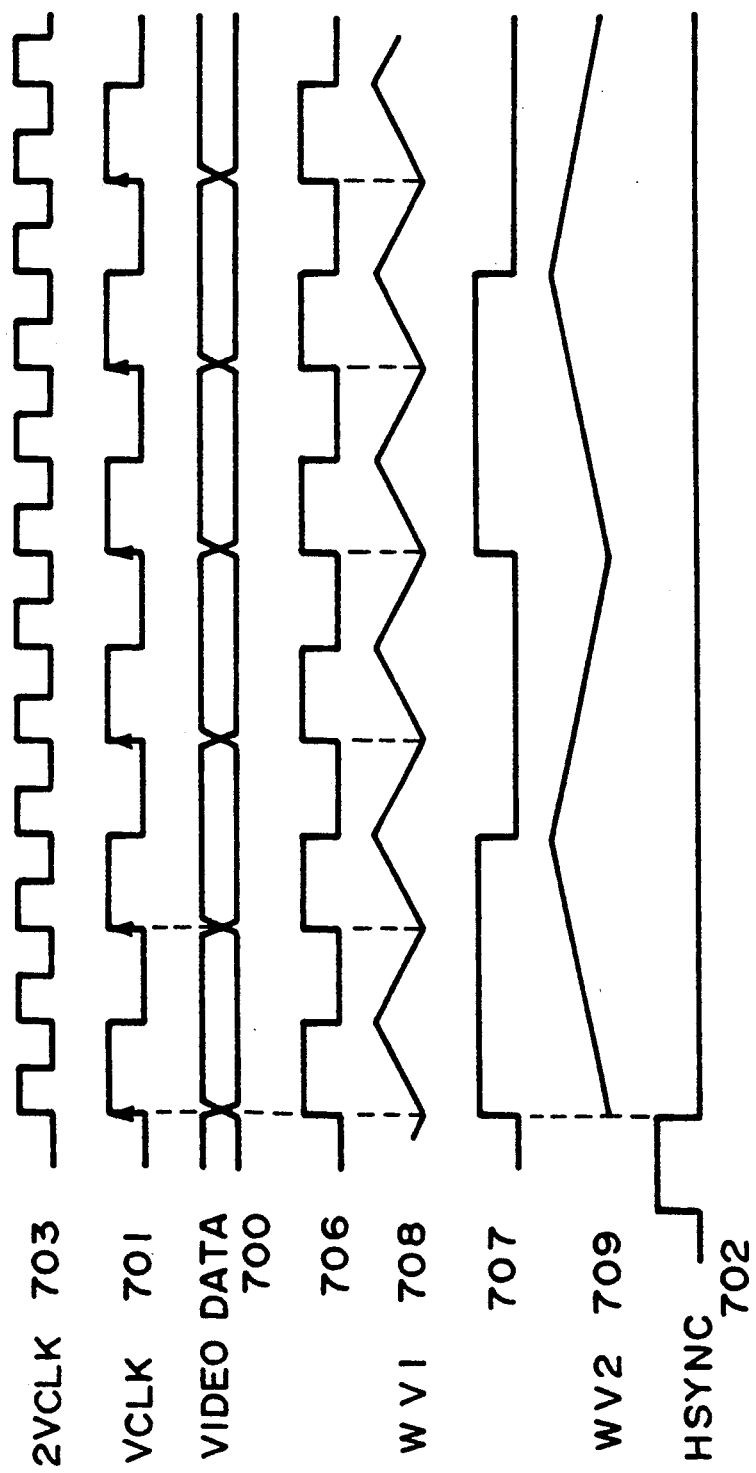
FIG. 15B is a timing chart showing the function of the circuit shown in FIG. 15A.

FIG. 15A is a block diagram of the PWM circuit, and FIG. 15B is a corresponding timing chart.

Figure 15C:
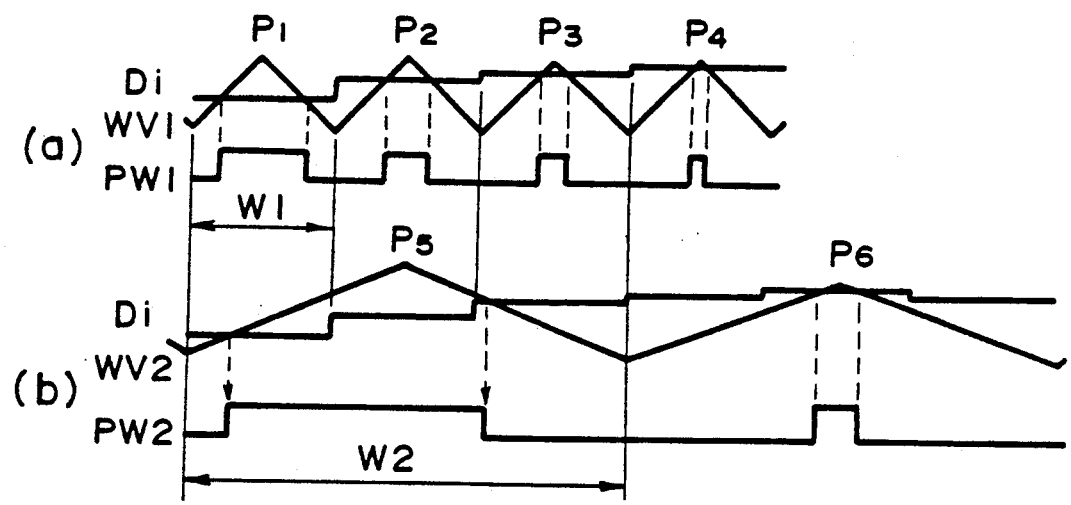
FIG. 15C is a chart showing the relation between the pulse width modulation of the image signal and a tonal screening.

The input video signal 700 is latched by a latch circuit 600 at the start of a clock signal VCLK 701, thus synchronized therewith (cf. 700, 701 in FIG. 15B). The video signal 715 released from the latch is subjected to a tone correction in a look-up table 601, then to a D/A conversion in a D/A converter 602 to generate a continuous analog video signal, which is compared in comparators 610, 611, with triangular waves 708, 709 which are synchronized with the clock signal VCLK but are generated independently. The former is a triangular wave WV1 generated in a generating circuit 608 according to a reference signal 706 which is obtained, in the J/K-flip-flop 606, by dividing by two the frequency of a clock signal 2VCLK 703 of a doubled frequency of the clock signal VCLK 701, while the latter is a triangular wave WV2 generated in a generating circuit 609 according to a reference signal 707 which is obtained, in a frequency dividing circuit 605, by dividing by six the frequency of the clock signal 2VCLK. These triangular signals and the video signal are all synchronized with the clock signal VCLK as shown in FIG. 15B. Also in order to synchronize these signals with the HSYNC signal 702, circuits 605, 606 are initialized with the inverted HSYNC signal. In this manner the comparators 610, 611 provide output signals 710, 711 of varying pulse width according to the value of the input video signal 700, as shown in FIG. 15C. In the present system, the laser is turned on to print a dot on the recording sheet when an AND gate 613 shown in FIG. 15A releases an output signal "1", and the laser is turned off, thus not performing any record on the sheet when said output signal is "0". Thus the control signal LON (705) can control the turning off of the laser. FIG. 15C illustrates a state a state where the level of the image signal changes from black at left to white at right. As the PWM circuit receives a white input as "FF" and a black input as "00", the output of the D/A converter 602 changes as indicated in Di in FIG. 15C. On the other hand, the triangular waves WV1, WV2 vary as shown in (a) and (b), so that the outputs of the comparators show narrower pulse widths as the color changes from black to white, as indicated in PW1, PW2. Thus, when the signal PW1 is selected, the dots on the recording sheets are formed with spacings of P1, P2, P3 and P4, with a dynamic range W1 for the change of the pulse width. On the other hand, when the signal PW2 is selected, the dots are formed with spaces of P5 and P6, with a dynamic range W2 of pulse width, which is about three times of the case of the signal PW1. On the other hand, the resolving power is ca. 400 lines/inch for the case of PW1 and ca. 133 lines/inch for the case of PW2. In this manner the signal PW1 provides a resolving power which is about three times higher than that with the signal PW2, while the signal PW2 significantly improves the tonal rendition, with a dynamic range of pulse width about three times wider than that with the signal PW1. Consequently the signal SCRSEL 704 is so given from the outside as to select the PW1 in case a high resolving power is required or the PW2 in case a high tonal rendition is required. A selector 612 shown in FIG. 15A releases the PW1 or the PW2 from an output terminal O respectively when the SCRSEL signal 704 is "0" or "1".

A look-up table or table-conversion ROM 601 for tonal correction receives address signals K0, K1, K2 (712, 713), a table switch signal 714 and the video signal 715 and releases a corrected video signal. For example, when the signal SCRSEL 704 is set to "0", the outputs of a ternary counter 603 are all shifted to "0" whereby a correction table for PW1 is selected in the table 601. The signals K0, K1, K2 are switched according to the output color signal, for example (0, 0, 0) for yellow, (0, 1, 0) for magenta, (1, 0, 0) for cyan and (1, 1, 0) for black. In this manner the tonal rendition characteristic is switched for each color image, in order to compensate the difference in tonal rendition in different colors of the laser beam printer. Also it is possible to achieve wider tonal corrections through the combinations of the signals K0, K1 and K2. For example it is possible to select the tone conversion characteristic of each color, according to the nature of the input image. Then, in case of setting the signal SCRSEL to "1" for selecting the PW2, the ternary counter 603 counts the line synchronizations signals and releases signals "1", "2", "3", "1", "2", "3", . . . in succession to the address terminal of the table 601, thus further improving the tonal rendition by switching the tone correction table for each line.

Figure 16A:
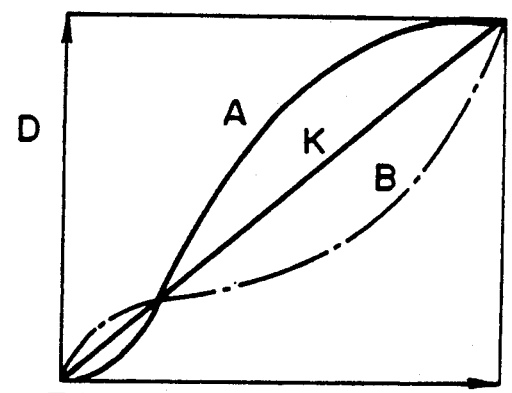
FIGS. 16A and 16B are charts showing tonal corrections with different tonal screens.
Figure 16B:
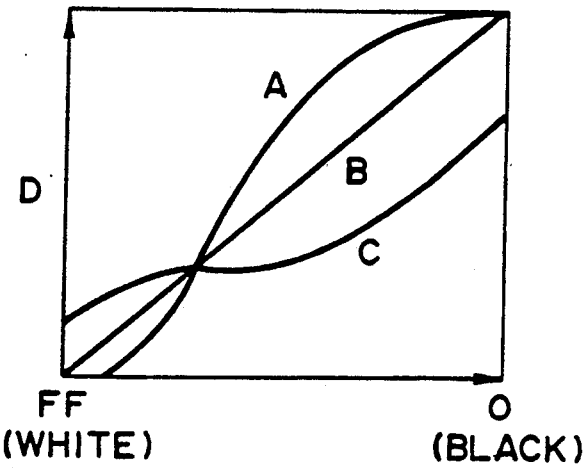
Figure 17A:
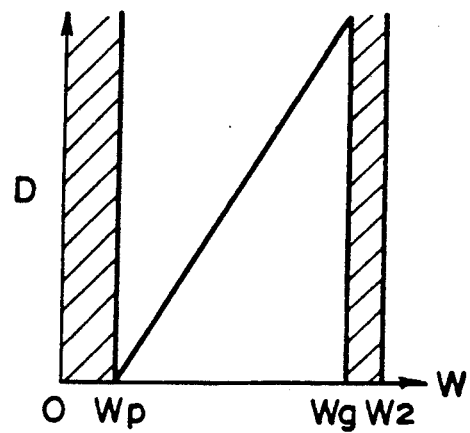
FIGS. 17A and 17B are charts showing relationship between the effective pulse width of laser and tonal rendition.
Figure 17B:
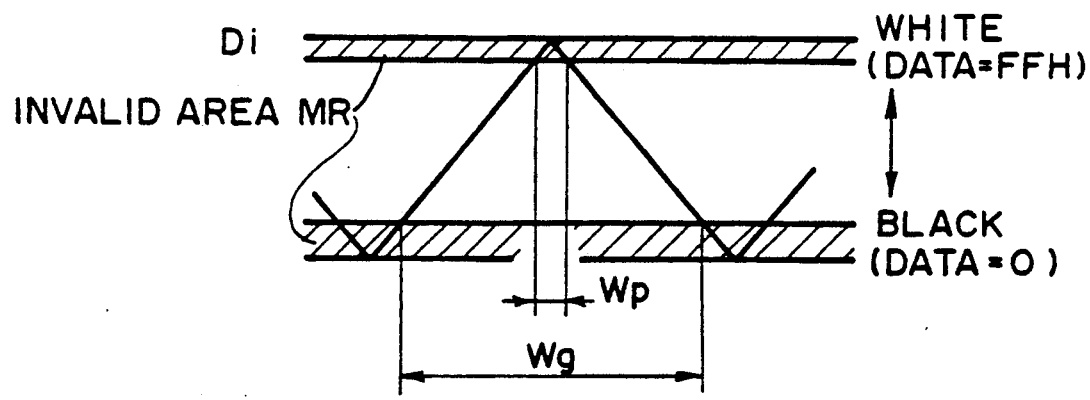

These operations will be clarified in detail in relation to FIG. 16 and ensuing drawings. In FIG. 16A, a curve A represents an input signal-density characteristic when the PW1 is selected and the input signal is changed from "FF" or "white" to "00" or "black". A desirable standard characteristic is represented by K, so that the tone correction table has a curve B which is opposite to A. FIG. 16B shows tone correction characteristics A, B, C for different lines in case the PW2 is selected. The pulse width is rendered variable by the aforementioned triangular wave in the main scanning direction, and three tonal rendition characteristics are provided in the sub scanning direction as illustrated, for further improving the tonal characteristics. The curve A becomes dominant in an area where the density change is steep to reproduce such steep density change, while the curve C reproduces a milder density change, and the curve B is effective for an intermediate density change. In this manner a certain tonal characteristic is ensured even when the PW1 is selected, and an excellent tonal rendition is assured when the PW2 is selected. With respect to the aforementioned pulse width, the ideal dynamic range is represented by $0 \leq W \leq W2$ in case of the PW2, but, because of the electrophotographic characteristic of the laser beam printer and the response characteristic of the laser driver etc., there exist a range $0 \leq W \leq wp$ as shown in FIG. 17 in which a dot is not printed below a certain pulse width, and a range $wq \leq W \leq W2$ in which the density is saturated. Consequently the pulse width is so controlled as to vary within an effective linear range $wp \leq W \leq wq$. More specifically, when the input signal varies from "00" (black to "$FF_H$" (white), the pulse width varies from wp to wq, thus further ensuring linearity between the input signal and the image density.

The pulse width modulated video signal, obtained as explained above, is supplied through a line 224 to the laser driver 11L for mudulating the laser beam.

Image forming operation

Figure 6:
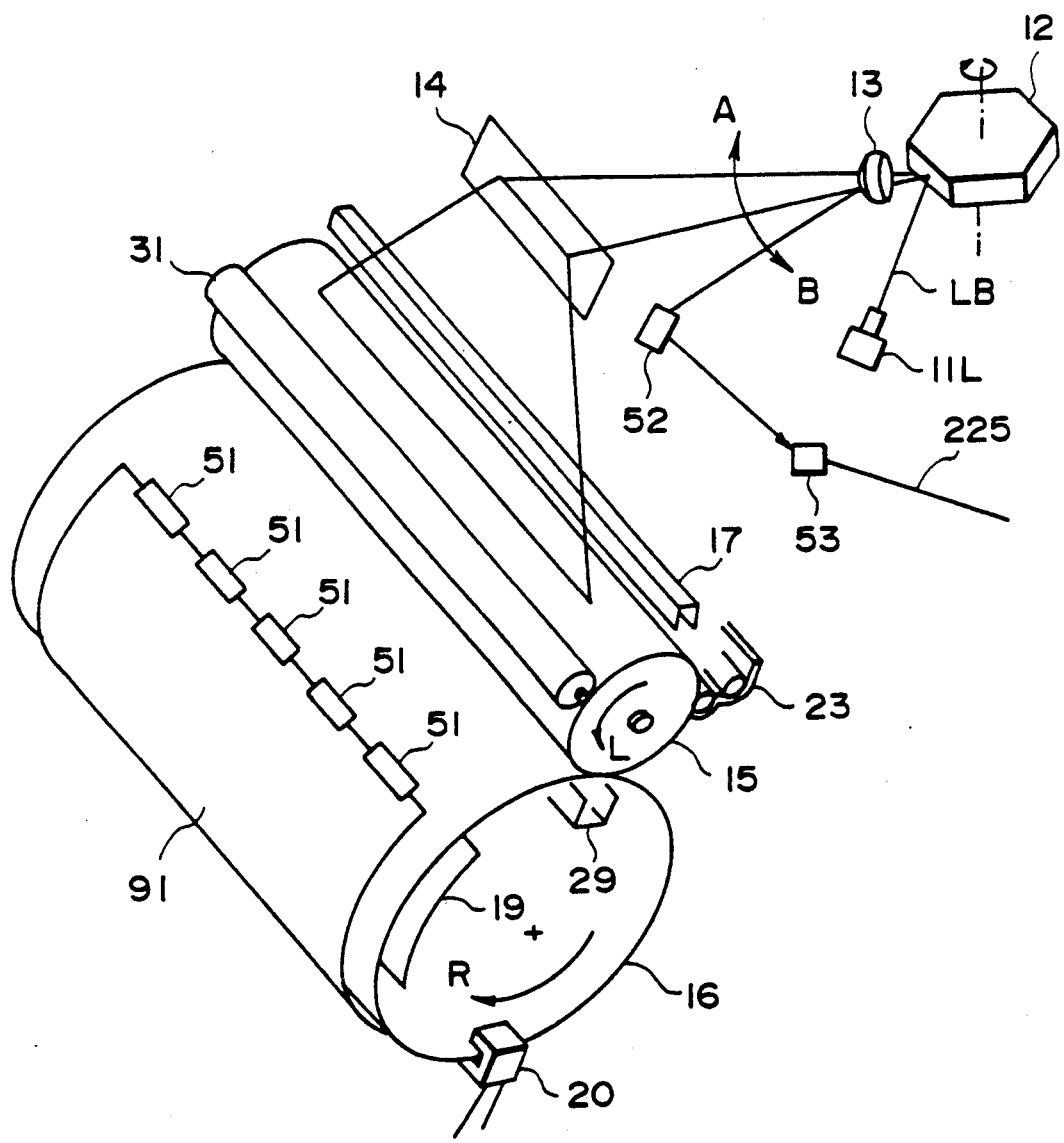
FIG. 6 is a partial perspective view showing an essential portion of a printer shown in FIG. 1.

The laser beam LB modulated in response to the image signal is deflected by a rotating polygon mirror 12 to perform a high-speed scanning motion between lines A and B shown in FIG. 6, and is focused on the photosensitive drum 15 through the $f/\theta$ lens 13 and the mirror 14, thus forming dots corresponding to the image signal. A horizontal scanning with the laser beam corresponds to a horizontal scanning of the original image, and to a width of 1/16 mm in the sub scanning direction in the present embodiment.

The main scanning is achieved by the scanning motion of the laser beam, while the sub scanning is achieved by the rotation of the photosensitive drum 15 in a direction L at a constant speed. In this manner a two-dimensional image is exposed to form a latent image. Prior to said exposure, uniform charging is conducted with the charger 17, and toner development is conducted with the developing sleeve subsequently. For example, by development with the yellow toner of the developing sleeve 31Y corresponding to the first exposure in the color reader, a toner image corresponding to the yellow component of the original 3 is formed on the drum 15.

Said yellow toner image is transferred, by means of the transfer charger 29 positioned at the contact point of the photosensitive drum 15 and the transfer drum 16, onto a recording sheet 54 wound on said transfer drum 16 by a gripper 51 holding the leading end of said sheet. Similar processes are repeated for the magenta, cyan and black images to superpose these images on said sheet 54, thus obtaining a full-color image consisting of four toners.

Thereafter the sheet is peeled off from the transfer drum 16 by the movable finger 50 shown in FIG. 1, then guided to the fixing unit 43 by the conveyor belt 42 and subjected to the image fixing by the heat-pressure rollers 44, 45.

Image movement in sub scanning direction

Figures 3, 8B:
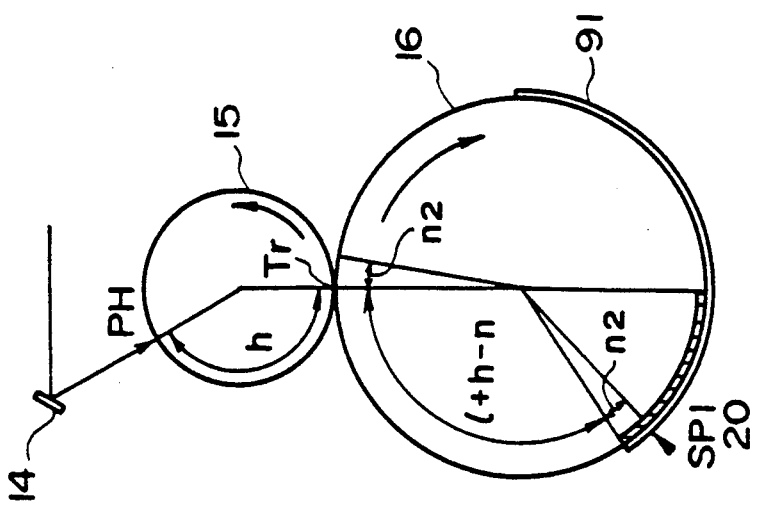
Figures 2, 8B:
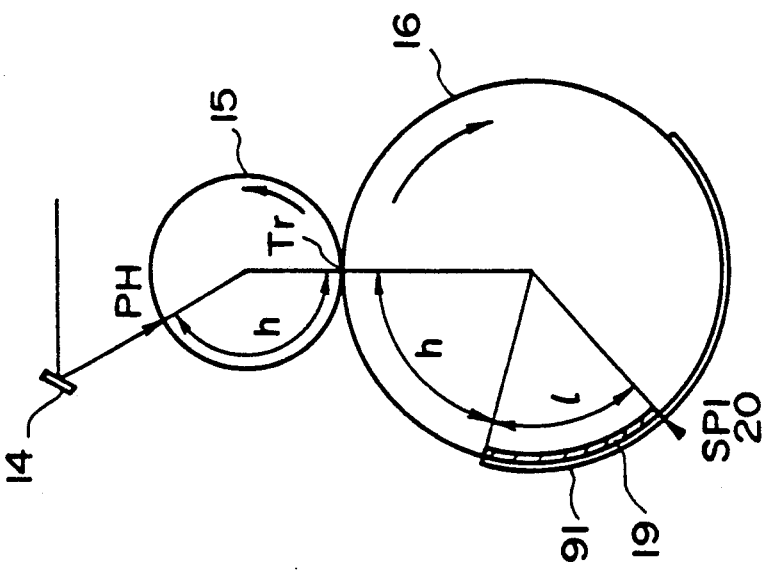
Figures 1, 8B:
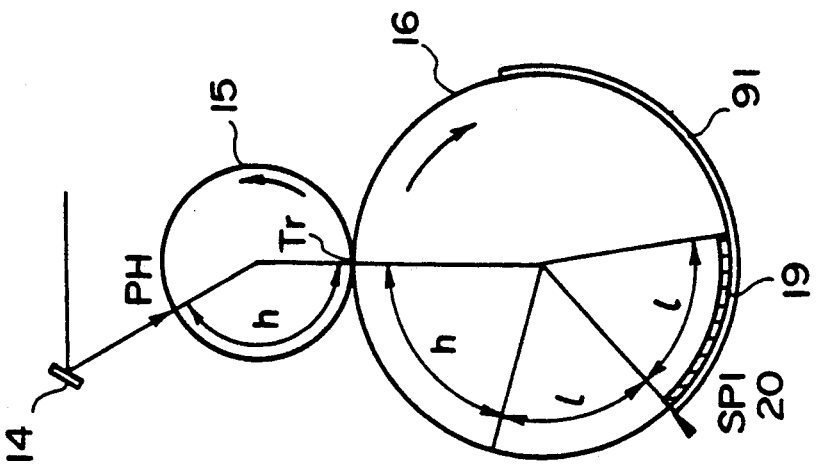

Now reference is made to FIG. 8 for explaining the image movement in the sub scanning direction.

FIG. 8A schematically shows the structure in the sub scanning direction, wherein A indicates a home position in stand-by state, while B and C are home positions in case the image reading areas are moved in the sub scanning direction.

Figures 1A, 7A:
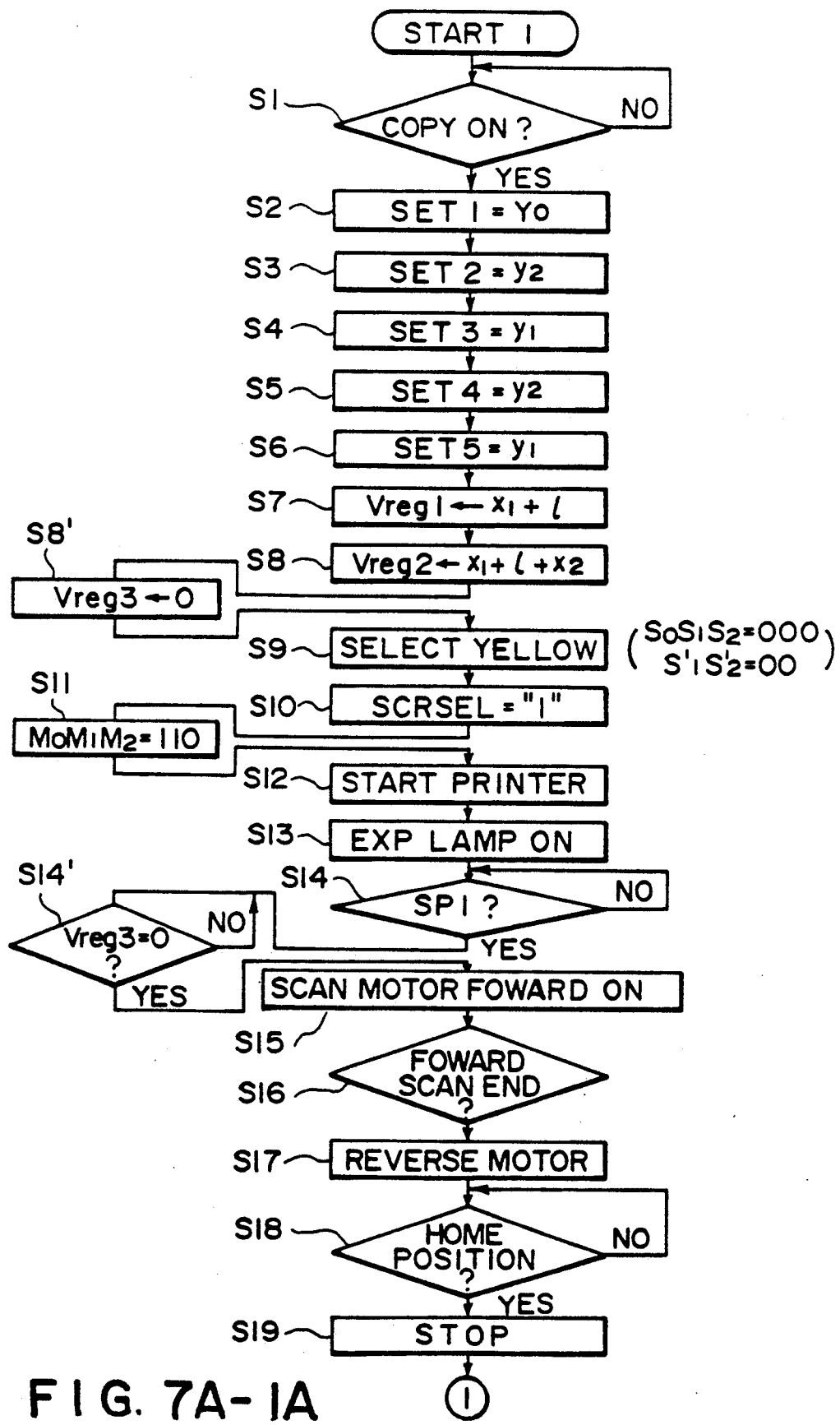
Figures 1A, 7A:
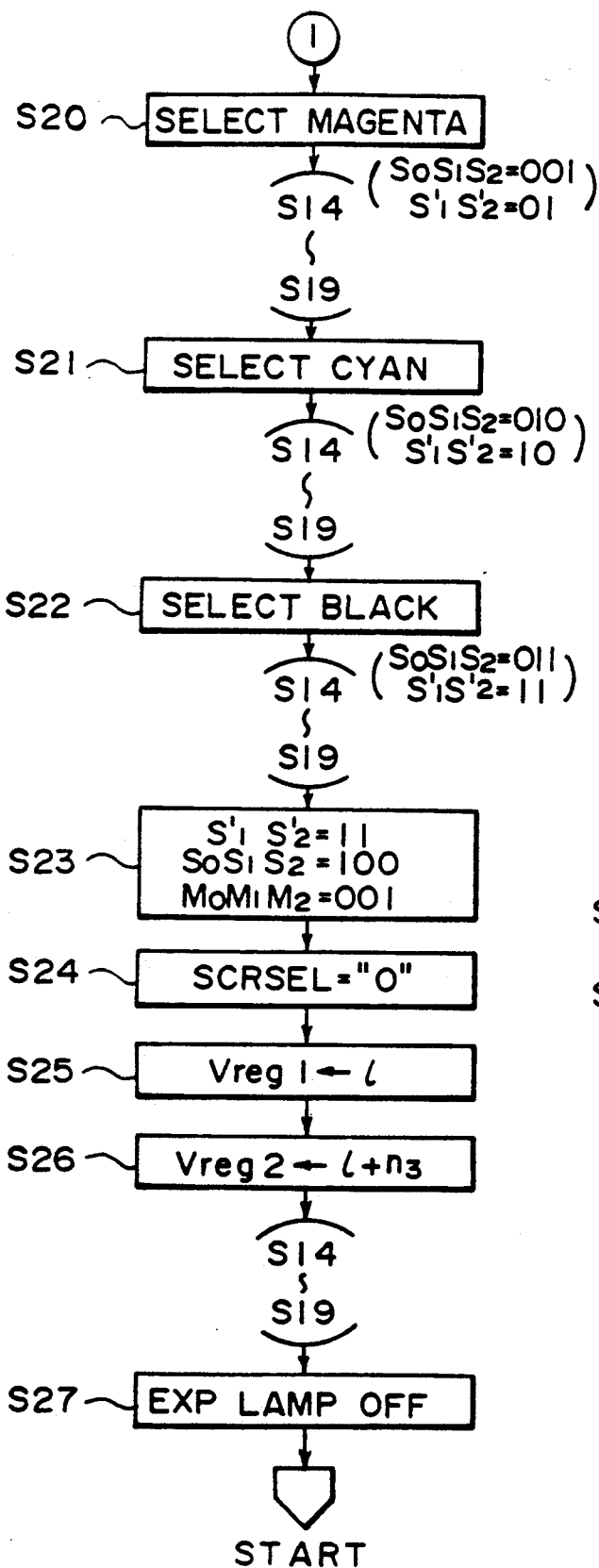
Figures 1, 7A:
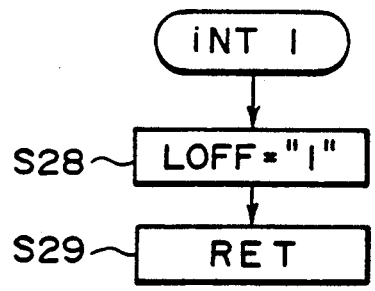
Figures 1B, 7A:
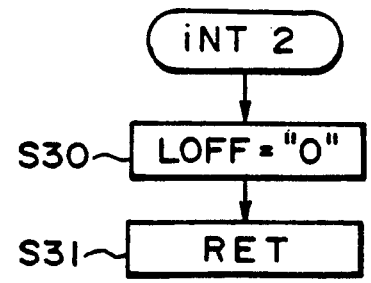
Figures 2, 7A:
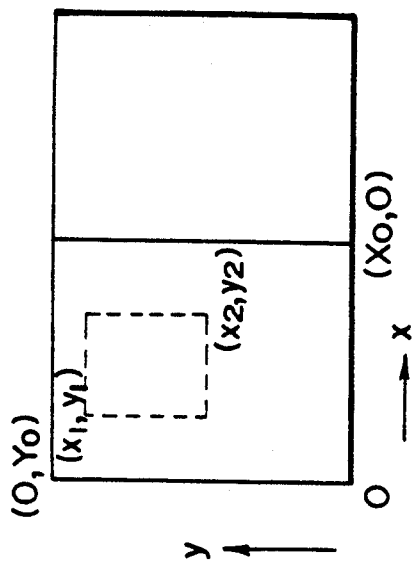
Figures 3, 7A:
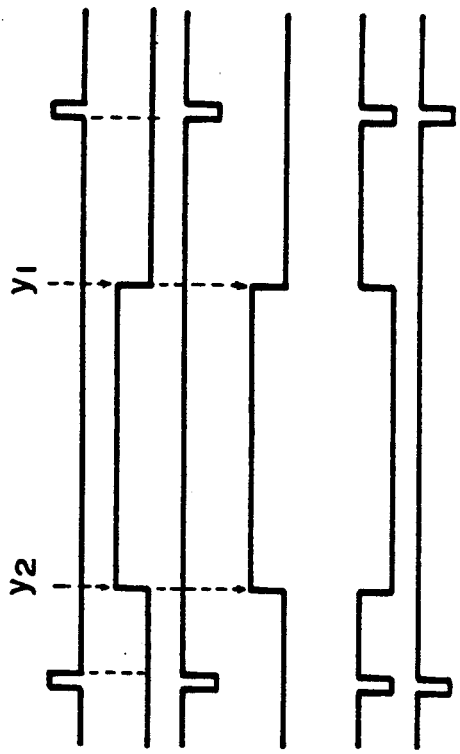

FIGS. 8B-1, 2, 3 show relationship of the recording positions on the recording sheet, in relation to FIG. 8A. In FIG. 8B-1, a hatched area on the periphery of the transfer drum 16 indicates the actuator plate 19 for generating a signal indicating the leading end of the sheet. Upon rotation by a distance (l+h) from the detection of the leading end of the sheet by the sensor S, the toner image on the photosensitive drum is transferred onto the recording sheet. In the normal copying operation, the reading operation of the reader is started from the home position A at the start of the signal S, so that a signal reading the front end T of the original at a distance l from the home position A modulates the laser beam hitting a point PH of the photosensitive drum. In this state the front end of the recording sheet 91 is positioned by a distance h from the transfer position Tr as shown in FIG. 8B-2, so that the image at the leading end T of the original is formed at the leading end of said recording sheet 91. Then, in the following, there will be explained a process in the sub scanning direction in case of reading an area a defined by (x1, y1) and (x2, y2) on the original support as shown in FIG. 8C and moving said area to a position defined by (x3, y3) and (x4, y4) on the recording sheet.

The reading home position of the reader unit is moved to a position B, which is in front, by a distance l, of the reading start position x1 in the sub scanning direction, and the reading operation is conducted with reference to said position B. In this manner the distance between the reading start position and the home position is constantly maintained at l. In order to start the recording on the sheet, after movement, from a position at a distance x3 from the leading end of the sheet, it will be understood that the reading operation can be started from said reading home position B for achieving a delay of n2 from the leading end of the sheet. In this manner the image read from the position x1 on the original support is recorded at a position x3 from the leading end of sheet (a distance n2 in FIG. 8B-3), with a resulting image movement in the sub scanning direction. In the present embodiment the reading unit is driven by a stepping motor, of which the number of driving pulses is proportional to the moving distance. Stated differently the distance can be defined by the number of pulses regardless of the scanning speed or the image magnification, and the aforementioned distances are represented in terms of the number of driving pulses for the stepping motor. The control is therefore simplified since the set values are constant regardless of the image magnification or of the scanning speed.

Function example 1

FIG. 7A-1 is a flow chart of the CPU 69 in a case of providing a full-color image of high tonal rendition in an image area designated by the digitizer and a monochromatic image (for example black) of a high resolving power (characters or linetone image) in other areas.

FIG. 7A-2 shows said area designated by the digitizer, defined by coordinates (x1, y1) and (x2, y2). A full-color image is produced in said area and a monochromic image is produced outside.

When a step S1 identifies the actuation of a copy button, step S2-S6 set area parameters, defining the area in the main scanning direction, in the circuit shown in FIG. 11. The step S2 sets the signal SET1 at Y0, and designates the entire effective image interval in the main scanning direction. The value of the SET1 is set in the counter 407 shown in FIG. 11. The steps S3, S4 set the SET2 value as y2 in order to define the trimming (image extraction) area or the masking area in the main scanning direction and the SET3 value as y1, respectively in the counters 408, 409. These settings are for generating the R.V.ENABLE signal for reading the designated area only. Then the steps S5, S6 set y2 as the SET4 and y1 as the SET5, respectively in the counters 410, 411.

In the present example, the SET2 is equal to the SET4 and the SET3 is equal to the SET5 since the reading position corresponds to the recording position.

At the image reading and formation, there are generated the R.V.ENABLE signal b, P.V.ENABLE signal d and laser control signal e or e' as shown in FIG. 7A-3. In the color image formation in the designated area, the mode signals M0, M1, M2 shown in FIG. 11 are set at (1, 1, 0), and the signals b, d and e' are selected as the R.V.ENABLE signal, P.V.ENABLE signal and laser control signal to trim the designated area. On the other hand, in the black image recording outside said area, said mode signals are set at (0, 0, 1), while the V.ENABLE signal C which is continuously on during the entire interval is selected as the R.V.ENABLE and P.V.ENABLE signals, and the signal e is selected as the laser control signal to mask the designated area.

Again referring to FIG. 7A-1, step S7 and S8 set values for defining the image area in the sub-scanning direction.

Figure 10B:
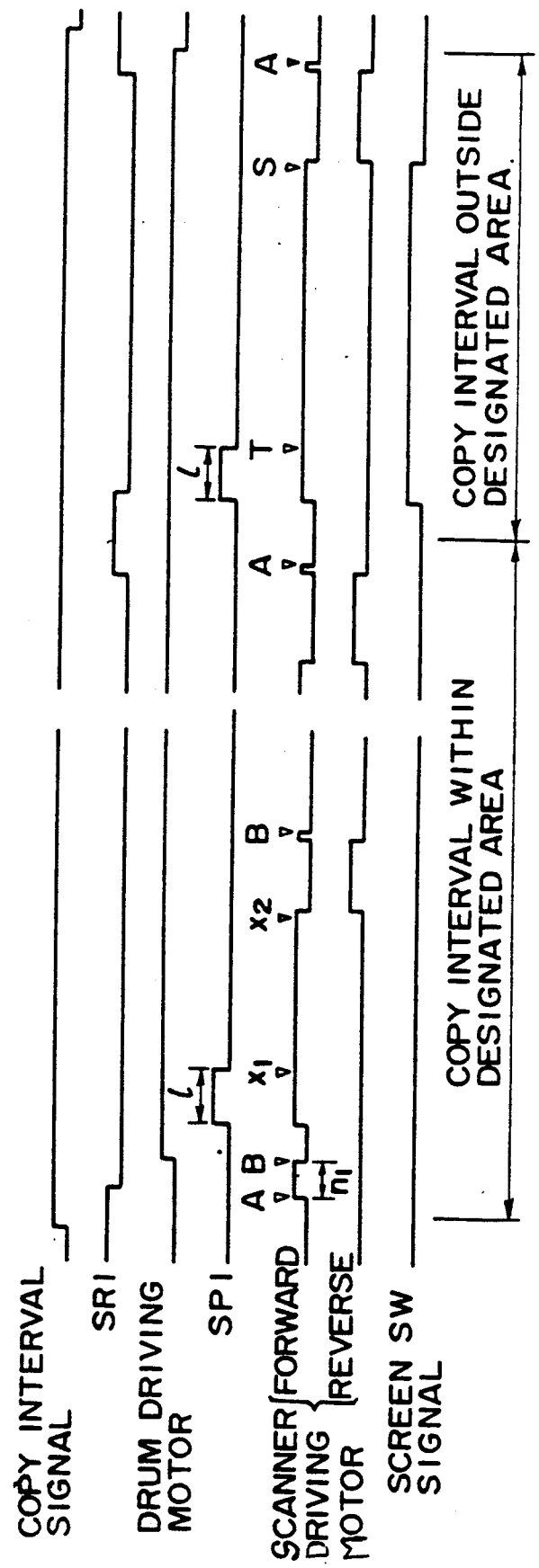
FIG. 10B is a timing chart of a sequence of the scanner and drum driving in the mode shown in FIG. 7A-1.

Internal register-counters Vreg1, Vreg2 of the CPU 69 receive the driving pulses (236 shown in FIG. 2) of the stepping motor, and, upon receiving pulses of numbers set in the steps S7 and S8, initiate internal interruption procedures, thus effecting a sequence INT1 (steps S28-S29) for Vreg1=0, or a sequence INT2 (steps S30-S31) for Vreg2=0. Thus, in the image output interval, from a position x1 in the sub scanning direction (distance l+x1 from the home position or l+n1 in FIG. 10B) to a position x2 (distance x1+l+x2), the laser output is enabled by shifting the signal LOFF to "1" at Vreg=1, i.e. in the step S28 in the routine INT1. Then yellow select signals S0, S1, S2=(0, 0, 0) are released for the first output color (step S9), and the aforementioned select signal SCRSEL=1 is supplied to the PWM circuit for selecting the high tonal rendition (step S10) Then the signals M0, M1, M2 are set at (1, 1, 0) to define the R.V.ENABLE, P.V.ENABLE and laser control signals for determining the effective image interval in the main scanning direction (step S11), and the printer is activated (step S12). Then a step S13 releases a lamp lighting signal 241 to turn on the lamp 7 for exposing the original, and awaits a sheet front end signal SP1 (FIG. 10B) from the printer. In a step S14, an internal counter Vreg3 for counting the HSYNC signal, which is reset to zero in the step S8, advances the stepping motor for driving the reader unit until a step S15. At the points x1 and x2 in the course of movement, the aforementioned interruption procedures INT1, INT2 are activated to control the laser function in the sub scanning direction. The reader unit is reversed in a step S17, and is stopped at the home position in steps S18, S19. Sensor for home position is unnecessary since the stepping motor is reversed with a number of driving pulses same as that supplied in the forward motion. Same procedures are repeated after a step 20 to form a halftone image composed of yellow, magenta, cyan and black in the broken-lined area in FIG. 7A-2 (corresponding to the timing of copying interval for the designated area shown in FIG. 10B).

Then a step S23 sets the signals S0, S1, S2 at (1, 0, 0) and the signals S'1, S'2 at (1, 1) to select a black mode with the ND monochromic signal and sets the mode select signals M0, M1, M2 at (0, 1, 1) to release the laser control signal e, R.V.ENABLE signal, P.V.ENABLE signal and V.ENABLE signal (C) shown in FIG. 7A-3. A step S24 then sets the signal SCRSEL at zero to select a high resolving power, and steps S25 and S26 set the counters Vreg 1 at l and Vreg2 at (l+n3), thereby enabling the laser function over the entire interval in the sub scanning direction. Thus an image is obtained outside the broken-lined area only shown in FIG. 7A-2 by repeating the steps S14–S19. In this manner a full-color image of a high tonal rendition is obtained inside the designated area, and a mono-color image of a high resolving power is obtained outside said area. Such copying mode is extremely effective for an original in which halftone images and linetone images are mixed. Though a full-color image of high tonal rendition is selected for the designated are in the foregoing example, it is also possible, by the operation unit 67, to select a monochromic image of a high resolving power in the designated area and a multi-color image of a high tonal rendition outside said area. It is naturally possible, also, to make plural designated areas and arbitrarily select a full-color image of a high tonal rendition or a mono-color image or a high resolving power for each area.

Function example 2

Figures 1, 7B:
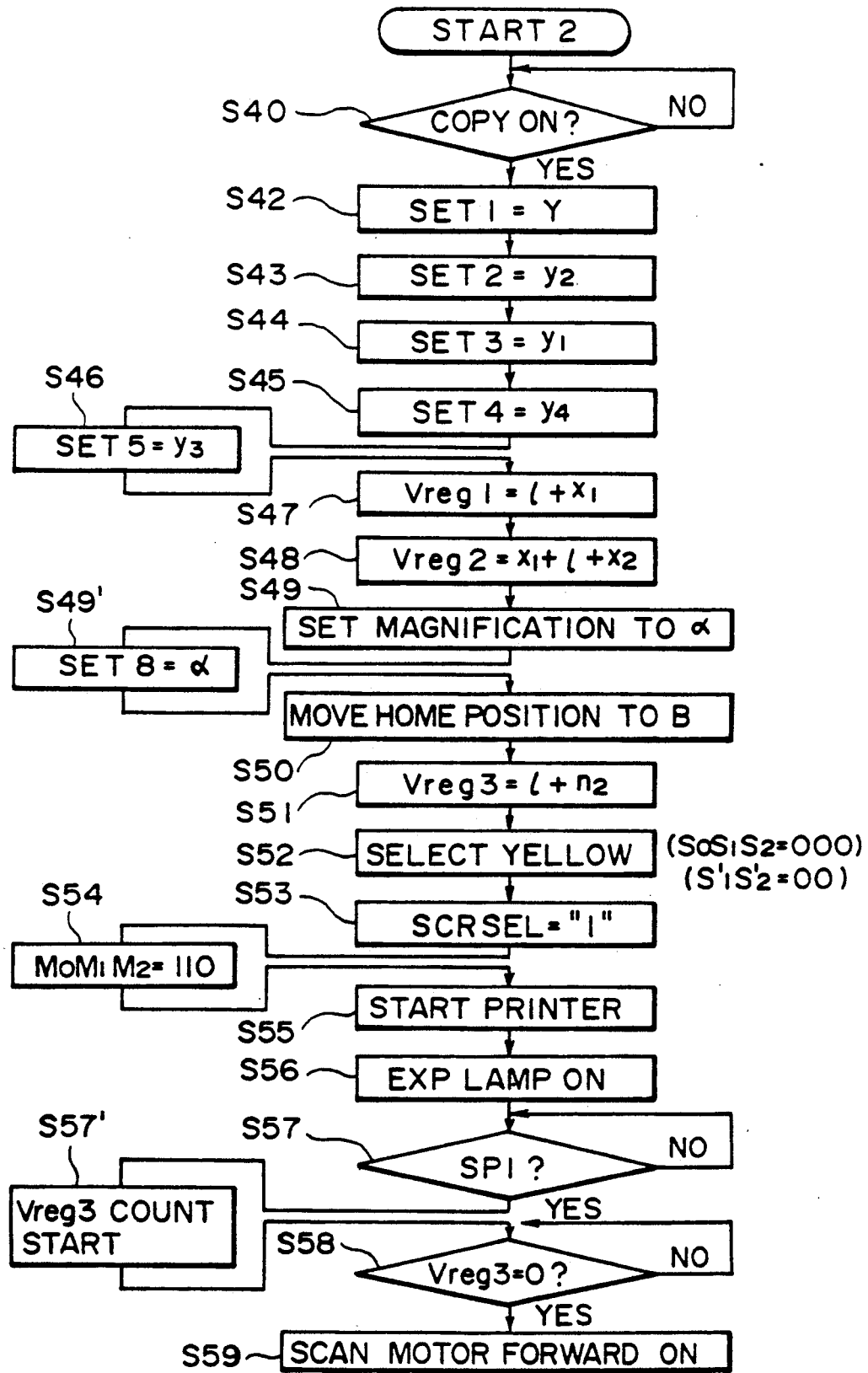
Figures 2, 7B:
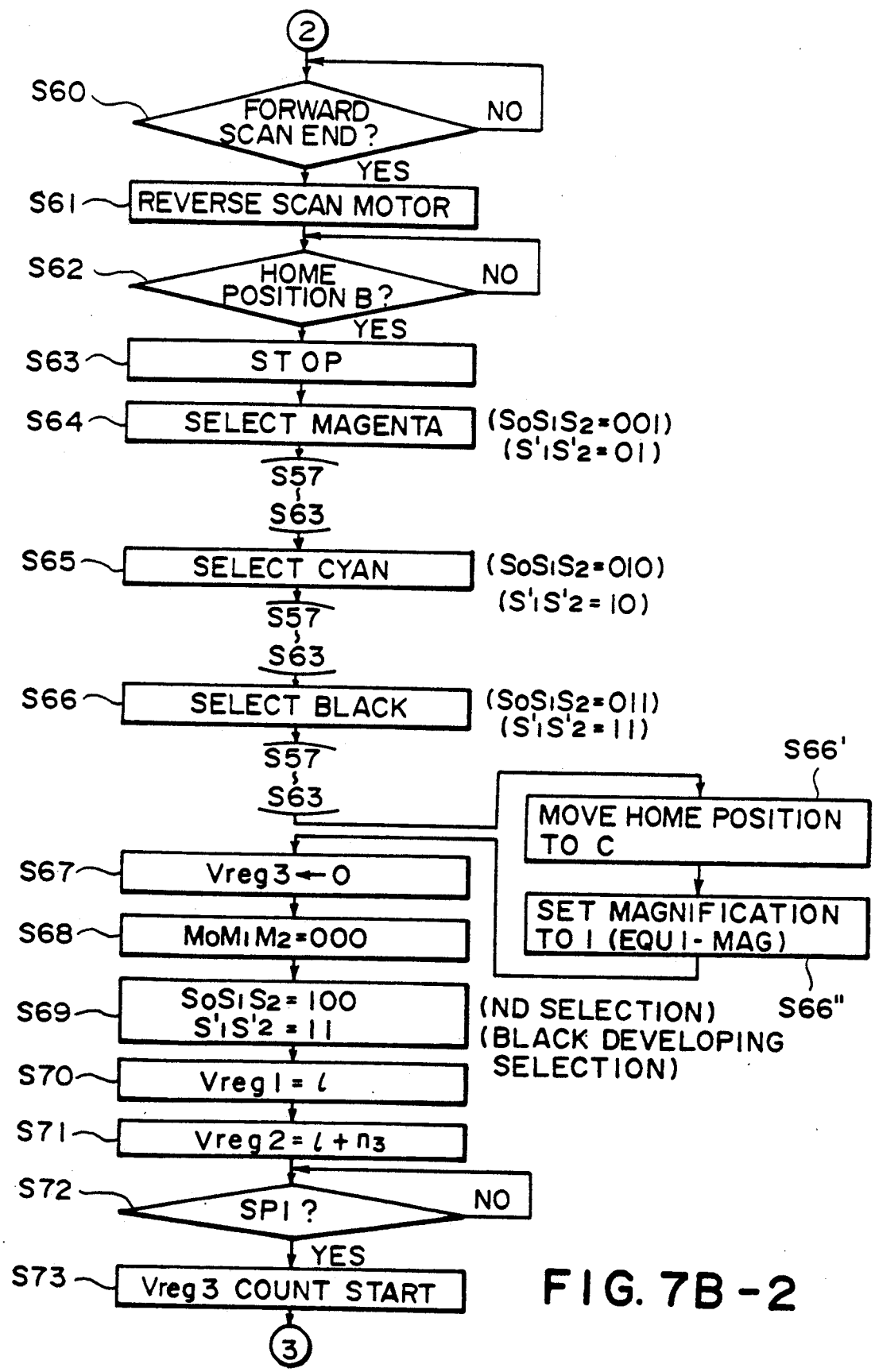
Figures 3, 7B:
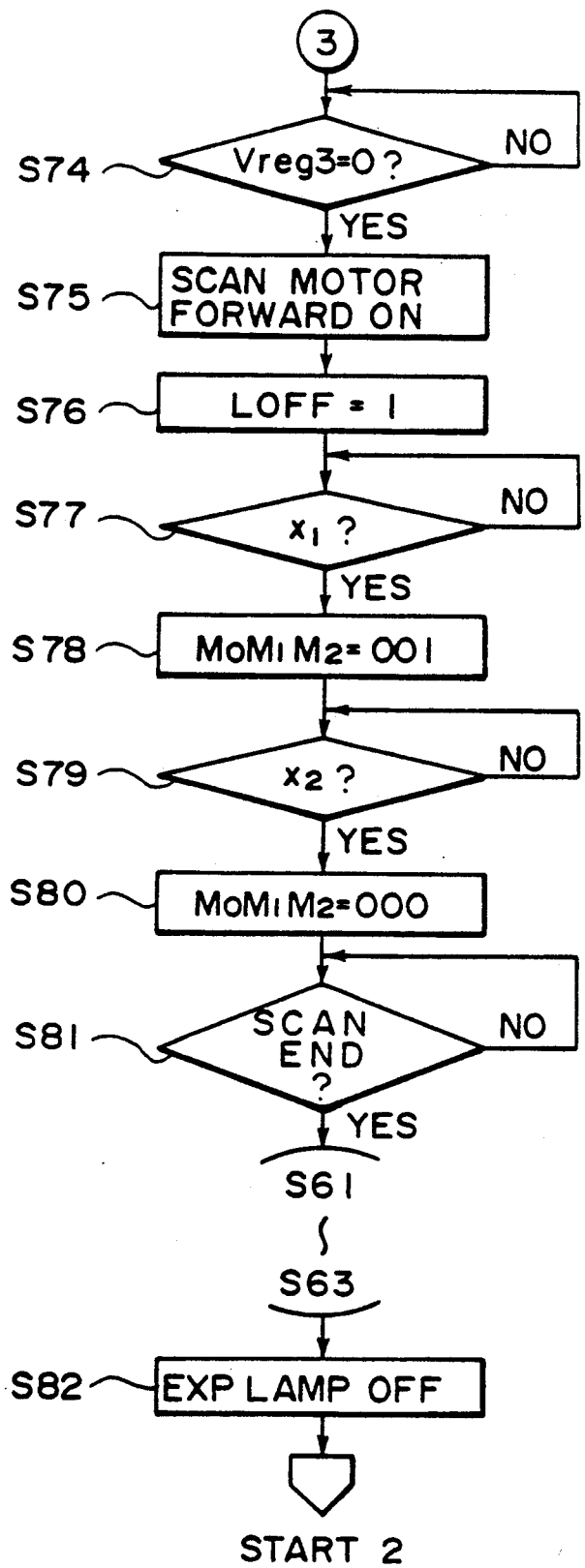
Figure 9:
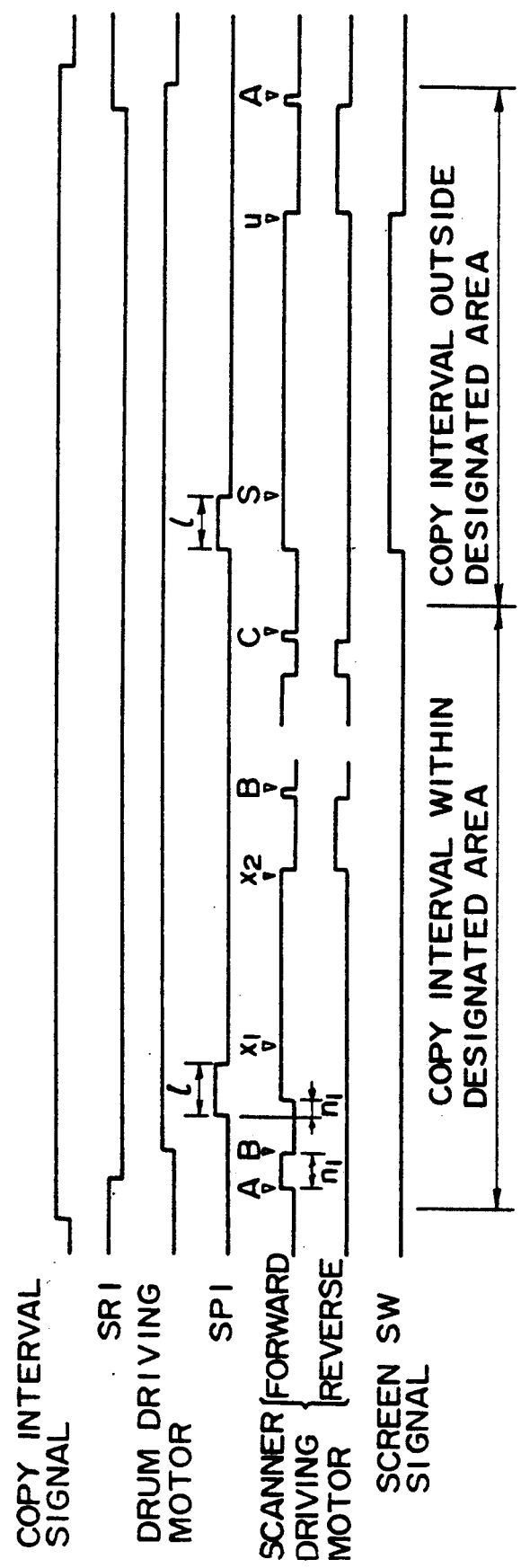
FIG. 9 is a timing chart of a sequence of the scanner and drum driving in the mode shown in FIG. 7B.

In the following there will be explained another example in which two originals are placed on the support as shown in FIG. 8C, and an area a of a first original placed between points T and S is moved to an area b of a second linetone original placed between points S and U and is reproduced as a multi-color of image of a high tonal rendition while the image of said second original outside said area b is reproduced as a monocolor image with a high resolving power. The image movement from a to b involves a magnification change. FIG. 7B is a flow chart for this example, and FIG. 9 is a corresponding timing chart.

In said flow chart, when the actuation of the copy button is detected in a step S40, a multicolor image of a high tonal rendition is provided with yellow, magenta, cyan and black in a similar sequence as shown in FIG. 7A. Consequently steps S42 to S48 are same as the steps shown in FIG. 7A except that the SET4 and the SET5 are respectively selected as y4 and y3. Steps S49, S49' set a magnification $= |(x2-x1)/(x4-x3)| = a$. The image magnification in the sub scanning direction is determined by the speed of the stepping motor, or the frequency of the driving pulses, and can therefore be adjusted by setting said magnification $a$ in the stepping motor driver 61. In the step S49', SET8 $= a$ determines the image magnification in the main scanning direction, as explained before. In the present example it is same as that in the sub scanning direction, but the image magnification may be selected differently in the main and sub scanning direction. Then the home position is moved to B (cf. FIG. 9). The start of image output at x3 from the leading end of the recording sheet is achieved by delaying the scanning motion of the reader unit by $1+x3$ from SP1 of the printer, corresponding to the start of scanning motion of the reader unit at Vreg3 $=0$ in the step S58. Then a step S52 selects yellow as first color, and a step S53 sets the signal SCRSEL as "1". A subsequent sequence to a step S63 and a repeated sequence in steps S64, S65 and S66 are same as those explained in FIG. 7A and will therefore not be explained in detail. A sequence starting from a step S67 effects the formation of a monocolor image of a high resolving power from a second linetone original placed between S and U in FIG. 8C, except the designated area b. A step S66' moves the home position to C which is in front, by a distance l, of the original reading position S, then a step S66" sets an equal-size image magnification $a = 1$, and a step S67 sets said distance l in the counter Vreg3. Then a step S68 sets the signals M0, M1, M2 at (0, 0, 0) to enable the laser function over the entire main scanning interval, and a step S69 sets the signals S0, S1, S2 at (1, 0, 0) to select the monochromic ND signal synthesized from three color signals. Then steps S70 and S71 set Vreg $= 1$ and Vreg2 $= 1 + n3$ to control the laser function in the sub scanning direction as explained before. In response to the detection of the image front end signal SP1 of the printer in a step S72, a condition Vreg3 $= 0$ is reached and the forward scanning motion is started by the stepping motor. Simultaneously the signal LOFF is shifted to "1", to enable the laser unit (step S76). Then at a position x1 in the sub scanning direction; the signals M0, M1, M2 are selected as (0, 0, 1) to select the laser control signals as shown in FIG. 7A-3, thereby masking said designated area (step S78). The masking is continued to a position x2 (step S79), then the output over the entire area is again started in a step S80, and the forward scanning motion is completed in a step S81. Steps S61 to S63 are same as explained before, and the sequence is terminated thereafter. In this manner the image of a designated area of a first original is reproduced as a multi-color image of a high tonal rendition, with movement to another designated area with a magnification change, and the image outside said designated area is reproduced as a monocolor image of a high resolving power.

Other examples

Though only one image is moved and modified in magnification in the foregoing example, various image syntheses and color changes are possible since both images can be freely moved and modified in magnification, and can further freely select colors. Also tone correction characteristic can be selected differently for the designated area and the outside area by suitably selecting K0, K1 and K2.

It is also reproduce the designated area and the outside area with respectively different color conversion modes by so selecting S1' and S2' as to reproduce colors different from the read colors.

In the foregoing example there are employed two originals, but a similar process is applicable in case an area to be moved and another area of destination are designated within a single original image.

Though the foregoing description has been limited to a color image forming apparatus utilizing an electrophotographic process, but the present invention is applicable to various recording methods, such as ink jet recording, thermal recording or thermal transfer recording. Also the image reading unit and the image forming unit need not be close but can be distant between which the image information is transmitted through a communication channel, for the purpose of the present invention.

As explained in the foregoing, an embodiment of the present invention allows to apply different processes to different areas of the original image and to form the images of both areas on a recording material after the movement of at least an image. Thus image formation is achieved in a simple operation with an extremely simple structure, in comparison with the conventional procedure of preparing plural copies and making a paste-up, or the conventional image processing with a memory of a large capacity.

Another embodiment of the present invention increases the resolving power in the monocolor copying mode, in comparison with that in the multi-color copying mode, thus enabling to clearly reproduce characters and linetone images. Also in the multi-color copying mode, the tonal rendition is improved in comparison with that in the monocolor copying mode. Thus there is obtained satisfactory halftone reproduction particularly required in the color copying, and the user can obtain these results without cumbersome designating procedure.

Still another embodiment of the present invention provides multi-color copy images and monocolor copy images mixed on a same recording material, according to the designation of multi-color copying mode and monocolor copying mode in different areas of the original image. Such embodiment provides optimum image reproduction for an original image in which color images and characters or linetone images are mixed, completely eliminating drawbacks of color aberrations in the characters or linetone images.

The present invention is not limited to the following embodiments but is subject to various modifications and variations within the scope and spirit of the appended claims.

What is claimed is:

1. A color image processing apparatus comprising:
   color scanning means for scanning an original image and generating a scanning clock signal and for generating a scanning top signal synchronously with a scanning operation;
   printing means for printing a printed image corresponding to the original image and generating a printing clock signal synchronously with a printing operation, and a printing top signal, said scanning clock signal and said printing clock being different from each other;
   an image memory into which signals from said color scanning means respectively corresponding to plural colors are written in accordance with the scanning top signal and from which the signals to be transmitted to said printing means are read in accordance with the printing top signal, said image memory being arranged such that a signal for a writing operation and a signal for a reading operation are substantially simultaneously input; and
   a memory control unit for addressing said image memory in the writing operation or the reading operation of said image memory,
   wherein said memory control unit includes
   a writing address counter for counting the scanning clock signal,
   a reading address counter for counting the printing clock signal, and
   control means for controlling said writing address counter and said reading address counter such that image data is read from said image memory before writing of the image data into said image memory is completed.

2. An apparatus according to claim 1, wherein said color scanning means includes a color charge-coupled device (CCD) line sensor.

3. An apparatus according to claim 1, wherein said printing means performs printing according to an electrophotographic process.

4. An apparatus according to claim 1, wherein said image memory has a capacity corresponding to at least one line.

5. An apparatus according to claim 1, wherein said memory control unit performs magnification-changing with respect to the original image scanned by said color scanning means, by controlling a ratio between a writing speed and a reading speed.

6. An apparatus according to claim 1, further comprising:
   clock generation means for generating a clock to be supplied to said writing address counter and said reading address counter.

7. An apparatus according to claim 1, wherein said image memory is means for compensating a difference of operation speed between said color scanning means and said printing means.

8. An apparatus according to claim 1, wherein said printing means plane-sequentially prints the color image.

9. An image memory means which is provided between color scanning means for scanning an original image and generating a scanning clock signal and for generating a scanning top signal synchronously with a scanning operation and printing means for printing a printed image corresponding to the original image and generating a printing clock signal and for generating a printing top signal synchronously with a printing operation, comprising:
   an image memory into which signals from said color scanning means respectively corresponding to plural colors are written in accordance with the scanning top signal and from which the signals to be transmitted to said printing means are read in accordance with the printing top signal, said image memory being arranged such that a signal for a writing operation and a signal for a reading operation are substantially simultaneously input; and
   a memory control unit for addressing said image memory in the writing operation or the reading operation of said image memory,
   wherein said memory control unit includes:
   a writing address counter for counting the scanning clock signal,
   a reading address counter for counting the printing clock signal, and
   control means for controlling said writing address counter and said reading address counter such that image data is read from said image memory before writing of the image data into said image memory in completed.

10. An apparatus according to claim 9, wherein said color scanning means includes a color charge-coupled device (CCD) line sensor.

11. An apparatus according to claim 9, wherein said printing means performs printing according to an electrophotographic process.

12. An apparatus according to claim 9, wherein said image memory has a capacity corresponding to at least one line.

13. An apparatus according to claim 9, wherein said memory control unit performs magnification-changing with respect to the original image scanned by said color scanning means, by controlling a ratio between a writing speed and a reading speed.

14. An apparatus according to claim 9, further comprising:
   clock signal generation means for generating a clock signal to be supplied to said writing address counter and said reading address counter.

15. An apparatus according to claim 9, wherein said image memory is means for compensating a difference of operation speed between said color scanning means and said printing means.

16. An apparatus according to claim 9, wherein said printing means plane-sequentially prints the color image.

17. A color image processing apparatus comprising:
color scanning means for scanning an original image and generating a scanning clock signal and for generating a scanning top signal synchronously with a scanning operation;
printing means for printing a printed image corresponding to the original image and generating a printing clock signal synchronously with a printing operation, and a printing top signal, the scanning clock signal and the printing clock signal being different from each other; and
an image memory into which signals from said color scanning means respectively corresponding to plural colors are written in synchronism with the scanning top signal and the scanning clock signal and from which the signals to be transmitted to said printing means are read in synchronism with the printing top signal and the printing clock signal,
wherein said image memory is arranged such that a signal for a writing operation and a signal for a reading operation are substantially simultaneously input.

18. An apparatus according to claim 17, wherein said color scanning means includes a color charge-coupled device line sensor.

19. An apparatus according to claim 17, wherein said printing means performs printing according to an electrophotographic process.

20. An apparatus according to claim 17, wherein said image memory has a capacity corresponding to at least one line.

21. An apparatus according to claim 17, wherein said memory control unit performs a magnification-changing operation with respect to the original image scanned by said color scanning means, by controlling the ratio between the writing speed and a reading speed.

* * * * *

UNITED STATES PATENT AND TRADEMARK OFFICE
CERTIFICATE OF CORRECTION

PATENT NO. : 5,280,348
DATED : January 18, 1994
INVENTOR(S) : TOSHIO HONMA, ET AL.

It is certified that error appears in the above-identified patent and that said Letters Patent is hereby corrected as shown below:

COLUMN 1

Line 16, "particularly" should read --particular--.

COLUMN 3

Line 56, "color" should read --of color--.

COLUMN 6

Line 2, "[Synchronization signal generating" should be deleted.
Line 3, "circuit]" should be deleted and insert the heading: --Synchronization signal generating circuit--.

COLUMN 7

Line 10, "chipes" should read --chips--.

COLUMN 8

Line 17, "determined" should read --determines--.
Line 43, "above-explainec" should read --above-explained--.

COLUMN 10

Line 56, "a state" (second occurrence) should be deleted.

UNITED STATES PATENT AND TRADEMARK OFFICE
CERTIFICATE OF CORRECTION

PATENT NO. : 5,280,348
DATED : January 18, 1994
INVENTOR(S) : TOSHIO HONMA, ET AL.

It is certified that error appears in the above-identified patent and that said Letters Patent is hereby corrected as shown below:

COLUMN 12

Line 5, "(black" should read --(black)--.
　　Line 10, "mudulating" should read --modulating--.

COLUMN 14

Line 53, "20" should read --S20--.

COLUMN 15

Line 9, "are" should read --area--.

COLUMN 16

Line 36, "reproduce" should read --possible to reproduce--.

COLUMN 17

Line 17, "following" should read --foregoing--.

COLUMN 18

Line 3, "clock" (both occurrences) should read
　　　　--clock signal--.
　　Line 13, "means" should read --apparatus--.

UNITED STATES PATENT AND TRADEMARK OFFICE
CERTIFICATE OF CORRECTION

PATENT NO. : 5,280,348
DATED : January 18, 1994
INVENTOR(S) : TOSHIO HONMA, ET AL.

It is certified that error appears in the above-identified patent and that said Letters Patent is hereby corrected as shown below:

COLUMN 18

Line 44, "in" should read --is--.

Signed and Sealed this

Thirteenth Day of December, 1994

Attest:

BRUCE LEHMAN

Attesting Officer   Commissioner of Patents and Trademarks